United States Patent
Izumi

[19]

[11] Patent Number: 6,055,030
[45] Date of Patent: Apr. 25, 2000

[54] LARGE SCREEN LIQUID CRYSTAL DISPLAY DEVICE AND MANUFACTURING METHOD OF THE SAME

[75] Inventor: Yoshihiro Izumi, Kashihara, Japan

[73] Assignee: Sharp Kabushiki Kaisha, Osaka, Japan

[21] Appl. No.: 09/039,039

[22] Filed: Mar. 13, 1998

[30] Foreign Application Priority Data

Mar. 24, 1997 [JP] Japan ................................... 9-069443

[51] Int. Cl.[7] .................................................. G02G 1/133
[52] U.S. Cl. .......................................................... 349/73
[58] Field of Search ........................ 349/73, 158; 345/1, 345/2, 3; 156/364.1

[56] References Cited

U.S. PATENT DOCUMENTS 5,661,531  8/1997  Greene et al. ............................ 349/73

FOREIGN PATENT DOCUMENTS 28086   7/1992  Japan .
122769  5/1996  Japan .

*Primary Examiner*—William L. Sikes
*Assistant Examiner*—James A. Dudek
*Attorney, Agent, or Firm*—Dike, Bronstein, Roberts & Cushman, LLP; David G. Conlin; Lisa Swiszcz Hazzard

[57] ABSTRACT

A liquid crystal display device includes a large substrate obtained by connecting a plurality of TFT substrates side to side a counter substrate provided so as to oppose the large substrate and a liquid crystal layer sealed between said large substrate and the counter substrate wherein on each of the plurality of TFT substrates, signal lines and scanning lines formed in a matrix, and active elements and pixel electrodes provided at junctions of the lines formed in the matrix are provided in such a manner that the pixel electrodes are formed closer to a connecting area of the small substrates than a line formed along the connecting area of the TFT substrates. According to the described arrangement, when cutting the connecting side of the TFT substrates by dicing, even if a chipping occurs on the connecting side, a line defect can be prevented.

35 Claims, 16 Drawing Sheets

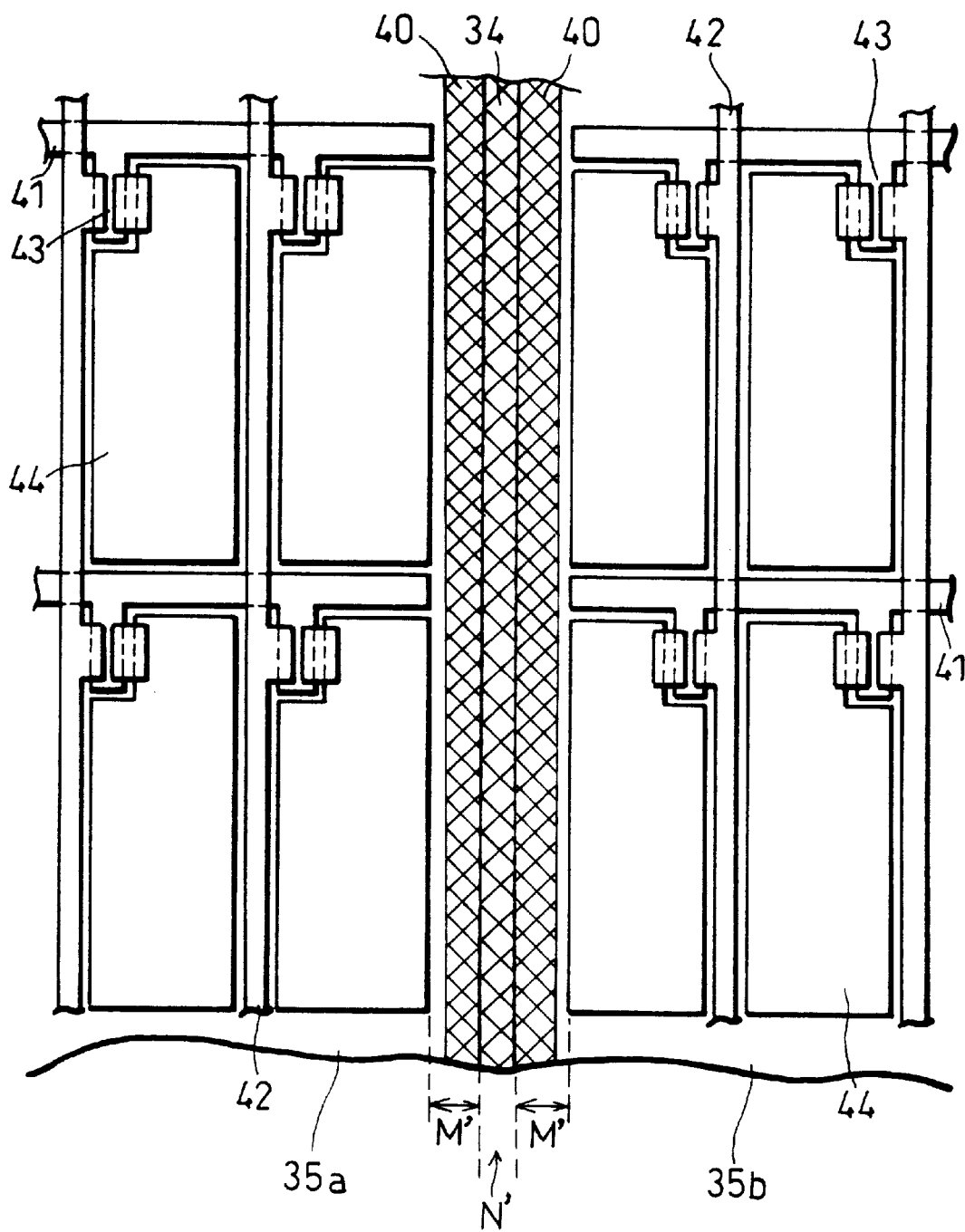

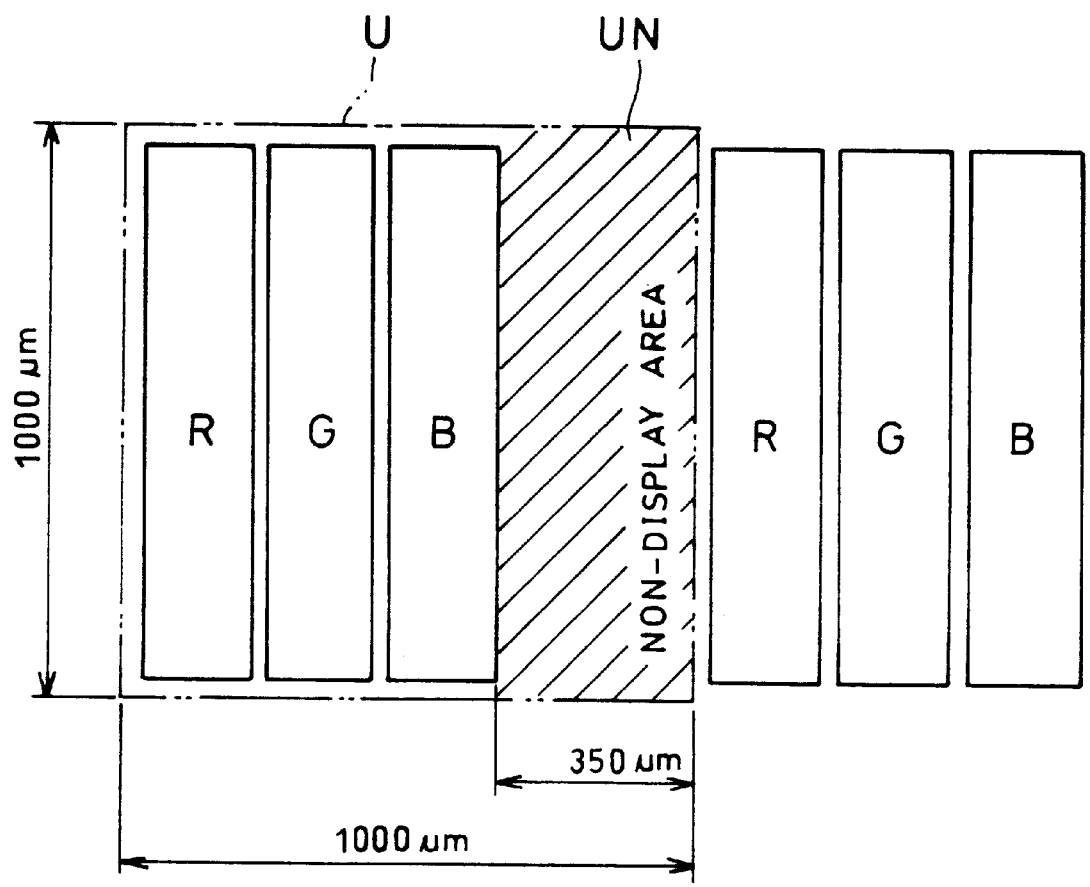

LARGE SCREEN LIQUID CRYSTAL DISPLAY DEVICE AND MANUFACTURING METHOD OF THE SAME

FIELD OF THE INVENTION

The present invention relates to large screen liquid display devices for use in display devices for AV (Audio Visual) equipments or OA (Office Automation) equipments and particularly relates to large screen display devices wherein a plurality of active matrix substrates or liquid crystal display panels are connected side to side and also relates to manufacturing methods of such large screen liquid crystal display devices.

BACKGROUND OF THE INVENTION

Recently, there is an increasing demand for display devices of lighter weight, higher-definition, thinner, lower power consumption and larger display area for AV equipments such as home-use TVs, OA equipments, etc. Examples of such display devices include CRT (Cathode-Ray Tube) displays, LCDs (Liquid Crystal Display), plasma displays, EL (Electroluminescent) displays, LED (Light Emitting Diode) displays, etc.

Among the described display devices, the use of the liquid crystal displays has achieved wide-spread acceptance in a variety of fields recently. The LCDs have an advantage over other display devices in that they can be installed even in a small space with ease and requires small power consumption because of its beneficial characteristics of thinner structure compared with other display devices. Moreover, as the LCDs are evolvable into full-color display with ease, they can be suitably applied to display devices of a large-sized display area. Thus, the LCDs are the best candidate for large-sized display area.

On the contrary, when upsizing the active matrix liquid crystal display device, an occurrence of a defect such as a disconnection of a line such as a signal line, a scanning line or a pixel defect, etc., significantly increases in the manufacturing process which raises the problem of an increase in a manufacturing cost. A solution to the described manufacturing method is disclosed, for example, by Japanese Unexamined Utility Model Publication No. 191029/1985 (Jitsukaisho 60-191029). This publication discloses a liquid crystal display device adopting a large substrate by connecting small substrates for at least one of the pair of substrates with electrodes.

FIG. 11(a) is a plan view of the above liquid crystal display device, and FIG. 11(b) is a cross-sectional view of the same taken along a line B–B' Specifically, a large substrate is prepared by connecting four active matrix substrates (hereinafter referred to as TFT substrates) 52 through 55 side to side to be positioned adjacently in a longitudinal direction and a lateral direction. Further, the resulting large substrate and a counter substrate (CF substrate) 51 with an electrode whereon color filters are formed are connected together via a spacer 57 so as to sandwich a liquid crystal layer 50.

Generally, when adopting the active matrix liquid crystal display device, it is difficult to manufacture at high yield the TFT substrate whereon fine active elements and pixel electrodes 71 which are provided for respective pixels are formed in a matrix in a large area. In order to counteract the described problem, a TFT substrate as one of the pair of substrates which constitute the liquid crystal display device is prepared using a plurality of small substrates, and a large TFT substrate is realized by connecting the small substrates side to side, and further by connecting the resulting large TFT substrate to the counter substrate which is the other large substrate having color filters to realize a large screen panel. As a result, an improved yield of the manufacturing process can be achieved.

In order to achieve an improved productivity, another large screen liquid crystal display device which is realized by connecting a plurality of liquid crystal panels side to side on a plane is disclosed by Japanese Unexamined Patent Publication No. 122769/1996 (Tokukaihei 8-122769).

FIG. 15(a) and FIG. 15(b) respectively show a plan view and a cross-sectional view of the liquid crystal display device. The left and right active matrix liquid crystal display panels 81 and 82 are connected side to side on the reinforcing substrate 83 by a bonding agent 84 to realize a large screen liquid crystal display device. The panels 81 and 82 respectively include TFT substrates 85 and 86, and counter substrates (CF substrates) 87 and 88 having electrodes and color filters formed thereon are connected together so as to sandwich a liquid crystal layer 89 using a seal 90. The seal 90 is formed at peripheral portion of each liquid crystal display panel, and the liquid crystal layer 89 is sealed within the seal 90. According to the liquid crystal display device of the described arrangement, by connecting the maximum size of the liquid crystal display panels that can be manufactured using the existing facilities, a large screen liquid crystal display device can be manufactured without requiring an installation of additional facilities for large size liquid crystal display device.

However, the described liquid crystal display device has the following drawbacks.

Japanese Unexamined Utility Model Application No. 191029/1985 (Jitsukaisho 60-191029) adopts a large size TFT substrate prepared in such a manner that a plurality of TFT substrates 52 through 55 are prepared beforehand, and the resulting TFT substrates 52 through 55 are connected side to side. As been well known, on the TFT substrate, formed are scanning lines (gate bus line) 72 and signal lines (source bus line) 73 in a matrix, and active elements 79 adopting thin film transistors (TFT elements) as switching elements and pixel electrodes 71.

As is clear from FIG. 11(a), for all the small TFT substrates 52 through 55 which constitute the large TFT substrate, the arrangement with regard to the relative position between (a) the signal lines 73 and the scanning lines 72 which are formed in a matrix and (b) the active elements 70 and the pixel electrodes 71 is the same. Specifically, for all the TFT substrates 52 through 55, (i) the active elements 79 composed of TFTs having gate electrodes connected to the signal lines 72 and (ii) the pixel electrodes 71 to be connected to the drains of the TFTS (ii) are formed on the right side of the signal lines 73 extending substantially parallel to a connecting side (Y-direction in the figure) between the TFT substrates 52 and 53 and below the signal line 72 extending in a line substantially orthogonal to the connecting side (X-direction in the figure).

FIG. 12 is an enlarged plan view showing a portion in a vicinity of the connecting area between the upper left TFT substrate 52 and the upper right TFT substrate 53. These upper left and right substrates 52 and 53 are connected via a connecting area using a bonding agent 56. It is preferable to arrange such that a pixel pitch in a region including the connecting area 60 is equal to a pixel pitch of a pixel region of the TFT substrates 52 and 53 to connect these substrates 52 and 53 smoothly. Therefore, the connecting face of each TFT substrate is required to be processed very smoothly with high precision and to make the connecting area 60 narrow.

However, when adopting a scribe cut method when cutting the TFT substrate from a mother glass into a predetermined size, as protrusions and recessions of around 0.5 mm are formed on the cut surface, it is impossible to obtain a smooth cut surface. Therefore, it is required to use a dicing device adopting the diamond blade in order to obtain a desirable smoothness of the cut surface. By adopting the dicing device, protrusions and recessions formed on the cut surface can be reduced to be not more than 0.05 mm.

Even in the case of adopting the dicing device, as shown in FIG. 13, fine defects (chipping) 63 may be formed along the edge of the cut surface of the TFT substrate 53. For example, by experience, when cutting the substrate by dicing under the conditions shown in Table 1, in the case of cutting the mother glass having a length of 550 mm, a width of 650 mm, and a thickness of 1.1 mm in a lateral direction, many small chippings (chipping width W of not more than 0.01 mm) and a few large chippings (chipping width W in a range of from 0.03 to 0.05 mm) are formed in a cut length of 650 mm.

TABLE 1

Dicing Conditions

| | |
|---|---|
| WORK TYPE | GLASS SUBSTRATE FOR LIQUID CRYSTAL PANEL |
| WORK SIZE | 550 mm * 650 mm *1.1mmt (MOTHER GLASS SIZE) 420 mm * 620 mm *1.1 mmt (CUT SIZE) |
| BLADE TYPE | DIAMOND BLADE #400 |
| BLADE SIZE | DIAMETER 127 mm THICKNESS 0.3 μm |
| NUMBER OF ROTATION OF SPINDLE | 12000 rpm |
| CUT SPEED | 2 to 3 mm/s |

By optimizing the dicing conditions, an occurrence of large chippings having a chipping width W of from 0.03 to 0.05 mm may be reduced; however, it is not possible to eliminate an occurrence of large chippings under manufacturing conditions which meet a demand for an improved productivity.

When large chippings (chipping width W in a range of from 0.03 to 0.05 mm) are formed in a connecting area of the TFT substrates, the following problems arise.

FIG. 14 is an enlarged plan view showing a vicinity of the connecting area when connecting the left and right TFT substrates 52 and 53 having chippings 63 in the connecting area. As shown in the figure, the chippings 63 formed when cutting by dicing may cause a disconnection of the signal line 73 adjacent to the connecting side of the right TFT substrate 53. Such chippings 63 may even cause a damage on the active element 70. As described, a large chipping 63 may significantly lower the productivity of the liquid crystal panel, but small chippings do not seriously affect the productivity by causing, for example, signal line disconnection.

Therefore, the structure which can eliminate a damage on a signal line or an active element even if large chippings (chipping width W of from 0.03 to 0.05 mm) occur along the edge of the TFT substrate 53 is desired.

As shown in the plan view of FIG. 15(a) and the cross sectional view of FIG. 15(b), the arrangement wherein the liquid crystal display panels 81 and 82 are connected has been proposed. As shown in FIG. 16, on the TFT substrates 85 and 86 for the liquid crystal display panel, formed are scanning lines (gate bus line) 91 and signal lines (source bus line) 92 in a matrix, and active elements (TFT elements) 93 and pixel electrodes 94 provided at respective junctions of the matrix. As described earlier, the seal 90 is formed in a flame along the circumference of each of liquid crystal display panels 81 and 82, and a liquid crystal layer 89 is enclosed inside the seal 90 formed in a flame. FIG. 16 is an enlarged plan view of the TFT substrates 85 and 86 in a vicinity of a connecting area of the left and right liquid crystal display panels 81 and 82 of the liquid crystal display device shown in FIG. 15(a) and FIG. 15(b).

The left and right TFT substrates 85 and 86 are connected via the connecting area 80 using the bonding agent 84, and the seal 90 for connecting the CF substrates 87 and 88 is formed along the connecting side of the TFT substrates 85 and 86. This seal 90 shows a seal pattern in a flame along the circumference of each of the liquid crystal display panels 81 and 82.

Here, by making the pixel pitch in the connecting area equal to the pixel pitch of other areas, a uniformity of the display can be achieved, and the connecting part becomes less outstanding. Thus, the seal 90 is required to be formed as narrow as possible, and to be formed adjacent to the pixel electrode 94 formed along the connecting side. Therefore, for the material of the seal 90, in order to avoid adverse effects on display pixel adjacent to the seal 90, such as display inferior, a photo-setting seal material whose shape is hardly affected when hardening is adopted.

However, in the case where the relative position of (i) the scanning lines 91 and the signal lines 92 formed in a matrix and (ii) the TFT substrate 93 and the pixel electrode 94 is the same between the left and right liquid crystal display panels 81 and 82, the following problems would arise in the arrangement shown in FIG. 16 where the scanning line 91, the TFT element 93 connected to the signal line 92 and the pixel electrode 94 are formed below the scanning line 91 extending in the X-direction and to the right of the signal line 92 extending in the Y-direction in the left and right TFT substrates 85 and 86.

Namely, in the case of connecting the TFT substrates 85 and 86 and the CF substrates 87 and 88 in a flame along the peripheral portion of the CF substrates 87 and 88, when hardening the seal resin by a projection of light by projecting light from the side of the CF substrates 87 and 88, light is blocked by the black matrix (BM) formed in a region facing the pixel electrode 94. Therefore, it is required to project light from the side of the TFT substrates 85 and 86. However, in the right TFT substrate 86, as shown in FIG. 16, as the seal 90 overlaps the signal line 92 formed along the connecting side, light may be blocked by the signal line 92, which causes a hardening inferior of the seal 90. This hardening inferior of the seal 90 adversely affects the display pixel adjacent to the seal 90 and causes, for example, a display inferior, etc.

In view of the above conventional problems, a development of an arrangement which prevents a hardening inferior of the seal 90 even when placing the display pixel adjacent to the seal 90 is desired.

SUMMARY OF THE INVENTION

It is an object of the present invention to provide a large screen liquid crystal display device prepared by a plurality of active matrix substrates, which can suppress a damage on a line or an active element due to a chipping formed on a connecting side of an active matrix substrates when cutting the sides of the active matrix substrates.

In order to achieve the above object, a liquid crystal display device of the present invention includes:

a large substrate obtained by connecting a plurality of small substrates side to side;

a counter substrate provided so as to oppose the large substrate; and a liquid crystal layer sealed between the large substrate and the counter substrate, wherein on each of the plurality of small substrates, lines formed in a matrix, and pixel electrodes provided at junctions of the lines formed in the matrix are provided in such a manner that the pixel electrodes are formed closer to a connecting area of the small substrates than the line formed along the connecting area of the small substrates.

According to the described arrangement, not the line but the pixel electrode is adjacent to a vicinity of the connecting side of the small substrates which constitute the liquid crystal display device. Therefore, when cutting the connecting side of the small substrates by dicing, even if a chipping occurs on the connecting side, a damage on the line, etc., can be prevented. Additionally, even if a large chipping which reaches the pixel electrode occurs, only the pixel affected by the chipping is damaged (dot defect), and a line defect such as a disconnection of the signal line, etc., can be prevented, thereby suppressing a display inferior to the minimum.

It is another object of the present invention to provide a large screen liquid crystal display device which can prevent an occurrence of a defective pixel due to a hardening inferior of a seal member for sealing respective liquid crystal display panels together by completely hardening the seal member.

In order to achieve the above object, a liquid crystal display device of the present invention is characterized by including: a plurality of liquid crystal display panels connected side to side on a plane, wherein each liquid crystal display panel includes a display substrate and a counter substrate provided so as to oppose the display substrate, and a liquid crystal layer sealed between the display substrate and the counter substrate, wherein each display substrate includes lines formed in a matrix, and pixel electrodes provided at respective junctions of the lines formed in the matrix, and the pixel electrode is formed at position closer to the connecting area than the line formed along the connecting area of the liquid crystal display panels.

According to the described arrangement, as lines are formed further from the connecting area than the pixel electrodes, even if the seal material is formed at the closest possible position to the pixel electrode adjacent to the connecting side, light to be projected from the side of the active matrix substrate can reach the seal material without being blocked by lines, thereby permitting the seal material to be hardened completely. As a result, the liquid crystal display device of the described arrangement permits a display inferior due to the hardening inferior of the seal material to be prevented, and thus an improved display quality of a large screen liquid crystal display device can be achieved.

In order to achieve the above object, a manufacturing method of a liquid crystal display device of the present invention, which realizes a large screen by connecting a plurality of display panels side to side on a plane, each liquid crystal display panel being composed of an active matrix substrate and a counter substrate with an electrode and a liquid crystal layer sealed between the active matrix substrate and the counter substrate by a seal material, the active matrix substrate including lines formed in a matrix and active elements and pixel electrodes formed at respective junctions of the lines, is characterized by including the steps of:

(a) preparing active matrix substrates in such a manner that the pixel electrodes are positioned closer to the connecting area than a line formed along the connecting area of the liquid crystal display panels;

(b) preparing the seal material at peripheral portions between the active matrix substrate and the counter substrate; and (c) hardening the seal material by projecting light from a side of the active matrix substrates.

According to the described method of manufacturing the liquid crystal display device, as lines are formed further from the connecting area than the pixel electrodes, even if the seal material is formed at a closest possible position to the pixel electrode adjacent to the connecting side, light to be projected from the side of the active matrix substrate can reach the seal material without being blocked by lines, thereby permitting the seal material to be hardened completely. As a result, the method of manufacturing the liquid crystal display device which can prevent a display inferior due to the hardening inferior of the seal material can be achieved, and thus the method offers the liquid crystal display device of an improved display quality.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

BRIEF DESCRIPTION OF THE DRAWINGS

FIG. 8 is an enlarged plan view schematically showing a vicinity of a connecting area of left and right TFT substrates which constitute the liquid crystal display device of FIG. 7(a);

FIG. 9 is a view schematically showing a structure of one pixel unit of the liquid crystal display device shown in FIG. 7(a);

DESCRIPTION OF THE EMBODIMENTS

[Embodiment 1]

The following descriptions will explain one embodiment of the present invention in reference to figures.

Figure 1A:
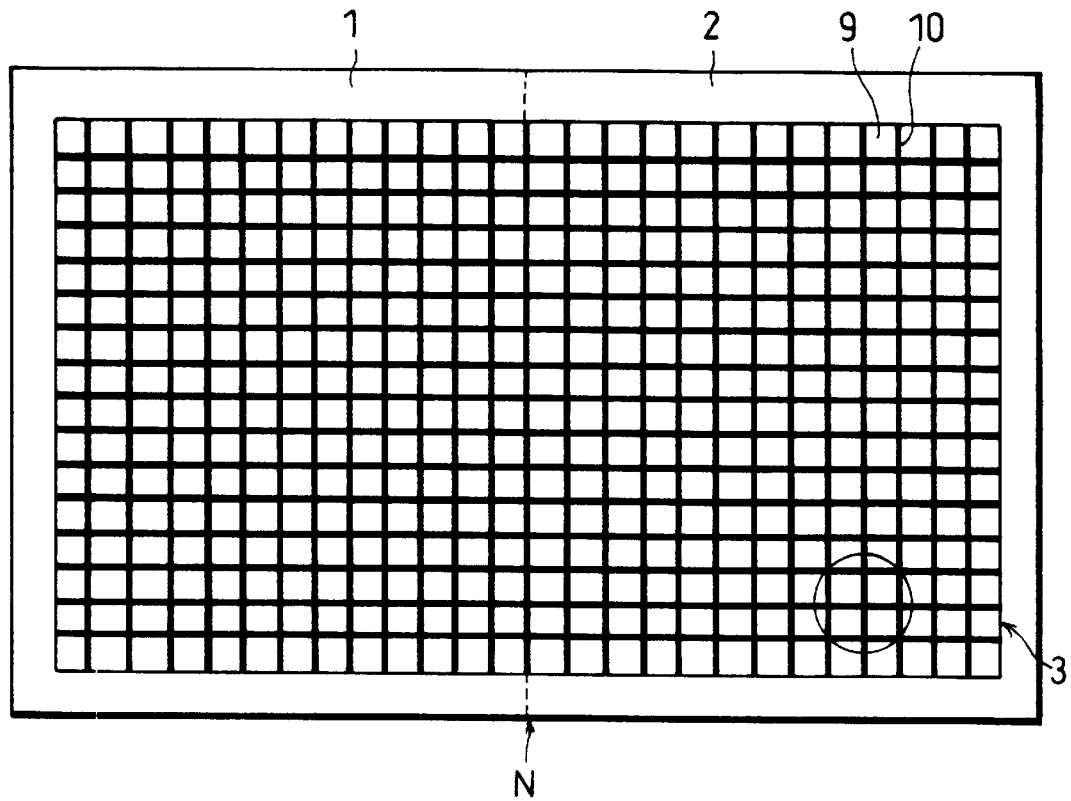
FIG. 1(a) is a plan view schematically showing a structure of a liquid crystal display device in accordance with one embodiment of the present invention.
Figure 1B:
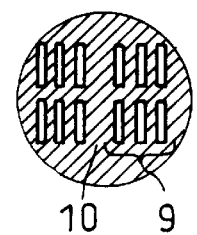
FIG. 1(b) is a partial enlarged view of FIG. 1(a)
Figure 1C:
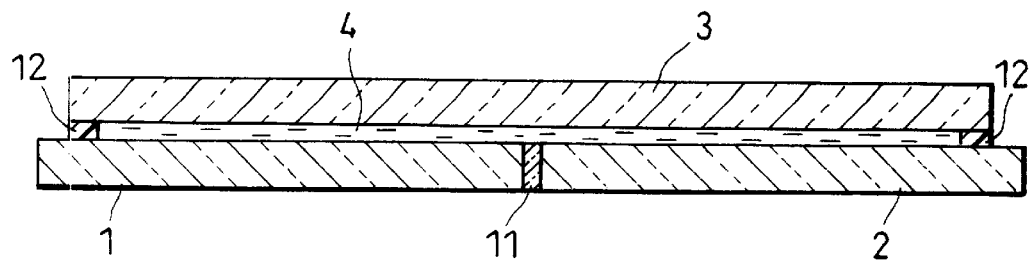
FIG. 1(c) is a cross-sectional view schematically showing the liquid crystal display device of FIG. 1(a)

FIG. 1(a) is a plan view showing a schematic structure of the liquid crystal display device in accordance with the present embodiment, and FIG. 1(c) is a cross-sectional view of the same. As shown in FIG. 1(a) and FIG. 1(c), the liquid crystal display device of the present embodiment has a large substrate wherein right and left TFT substrates 1 and 2 (small substrates, active matrix substrates) are connected side to side. This large substrate is connected to a counter substrate 3 (CF substrate) having a filter so as to sandwich a liquid crystal layer 4, thereby forming a large screen liquid crystal display device. The counter substrate 3 has an electrode substantially in the same size as that of the large substrate. Normally, the large substrate wherein the TFT substrates 1 and 2 are connected is formed slightly larger than the counter substrate 3 to ensure a space for connection terminals for the scanning lines and signal lines.

Figure 2:
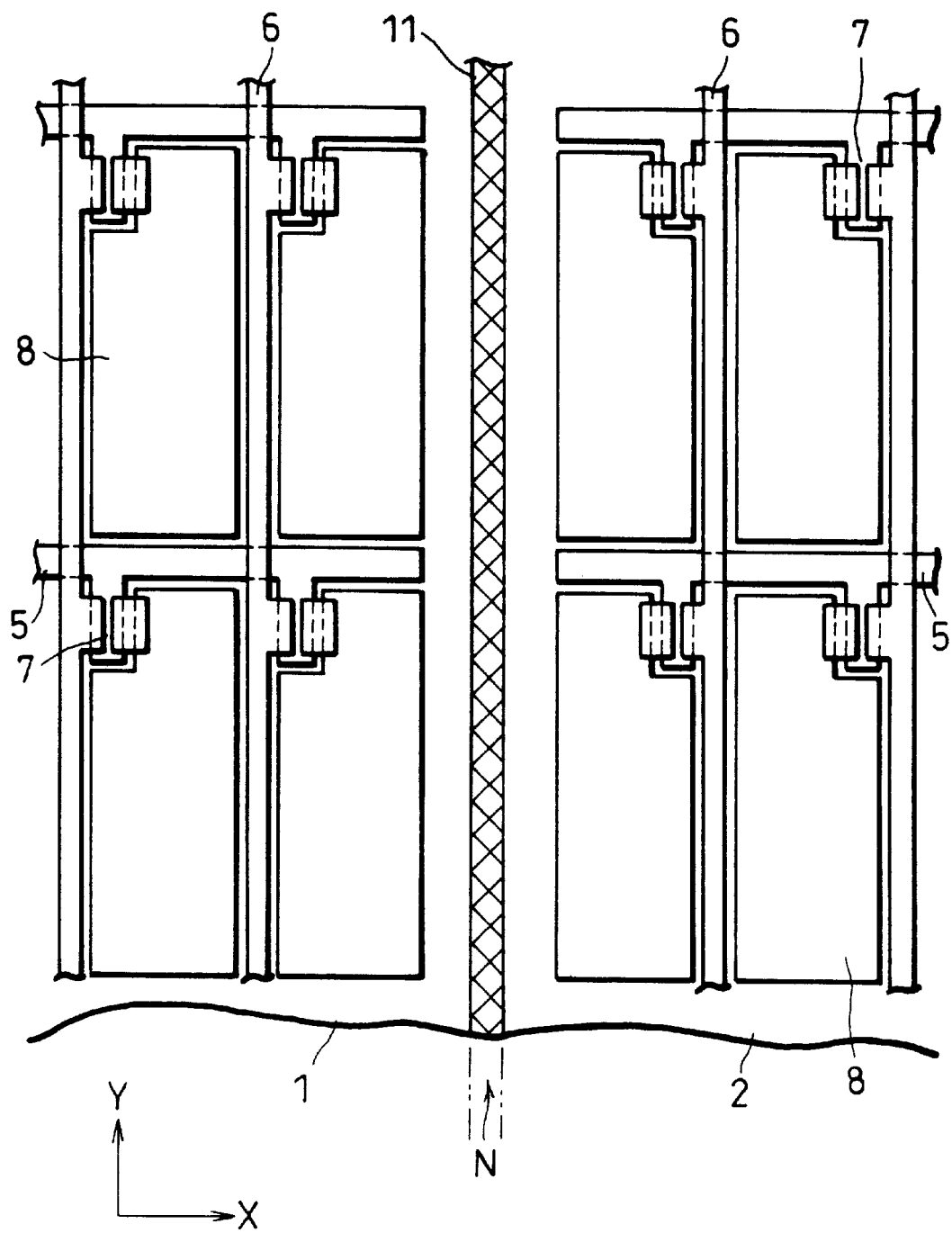
FIG. 2 is an enlarged plan view schematically showing a vicinity of a connecting area of right and left TFT substrates which constitute the liquid crystal display device of FIG. 1(a)

FIG. 2 is an enlarged plan view showing a vicinity of a connecting area of the left and right TFT substrates 1 and 2 which constitute the liquid crystal display device shown in FIG. 1(a). As shown in FIG. 2, each of the TFT substrates 1 and 2 is arranged such that scanning lines 5 (gate bus lines) and signal lines 6 (source bus lines) which are formed in a matrix, active elements 7 adopting thin film transistors (TFTs) made of a semiconductor material such as amorphous silicone, polysilicone, etc., provided at respective junctions in the matrix of the scanning and signal lines 5 and 6, and pixel electrodes 8 made of a transparent electrically conductive film such as Indium Tin Oxide (ITO), etc., are formed on a transparent substrate made of, for example, glass, using the known materials and processes. The TFT substrate is arranged such that the gate electrode is connected to the scanning line 5, the source electrode is connected to the signal line 6, and the drain electrode is connected to the pixel electrode 8.

On the other hand, the counter electrode 3 shown in FIG. 1(a) and FIG. 1(c) is arranged such that respective color filers 9 of red (R), green (G) and blue (B) colors provided so as to correspond to respective pixel electrodes 8, a light-shielding film (black matrix (MB)) 10 formed in a matrix for preventing a leakage of light through a space between the pixel substrates 8, and a common electrode made of a transparent electrically conductive film made of ITO, etc., are formed on a transparent substrate made of, for example, glass, using known materials and processes.

FIG. 2 shows a positional relationship of (i) the scanning and signal lines 5 and 6 provided in a matrix; and (ii) active elements 7 and the pixel electrodes 8. As shown in FIG. 2, the TFT substrate 1 formed on the left side of a connecting area N and the TFT substrate 2 formed on the right side of the connecting area N respectively have positional relationships of (i) the scanning and signal lines 5 and 6 provided in a matrix; and (ii) active elements 7 and the pixel electrodes 8 which are opposite to one another. Namely, in the above positional relationship, the TFT substrate 1 and the TFT substrate 2 are symmetrical with respect to the connecting area N.

Specifically, on the TFT substrates 1 on the left side of the connecting area N, the active elements 7 having the signal lines 6 connected to their source electrodes respectively, and pixel electrodes 8 are formed on the right side of the signal lines 6 extending in a direction substantially parallel to the connecting side (Y-direction in the figure). On the other hand, on the TFT substrate 2 formed on the right side of the connecting area N, the active elements 7 and the pixel electrodes 8 are formed on the left side of the signal lines 6 extending in the Y-direction. Namely, not the signal lines 6 but the pixel electrodes 8 are formed adjacent to a vicinity of the connecting area N of the left and right TFT substrates 1 and 2. In other words, on each of the TFT substrates 1 and 2, each pixel electrode 8 is formed closer to the connecting area N than the signal line 6 formed along the connecting area N.

Figure 3:
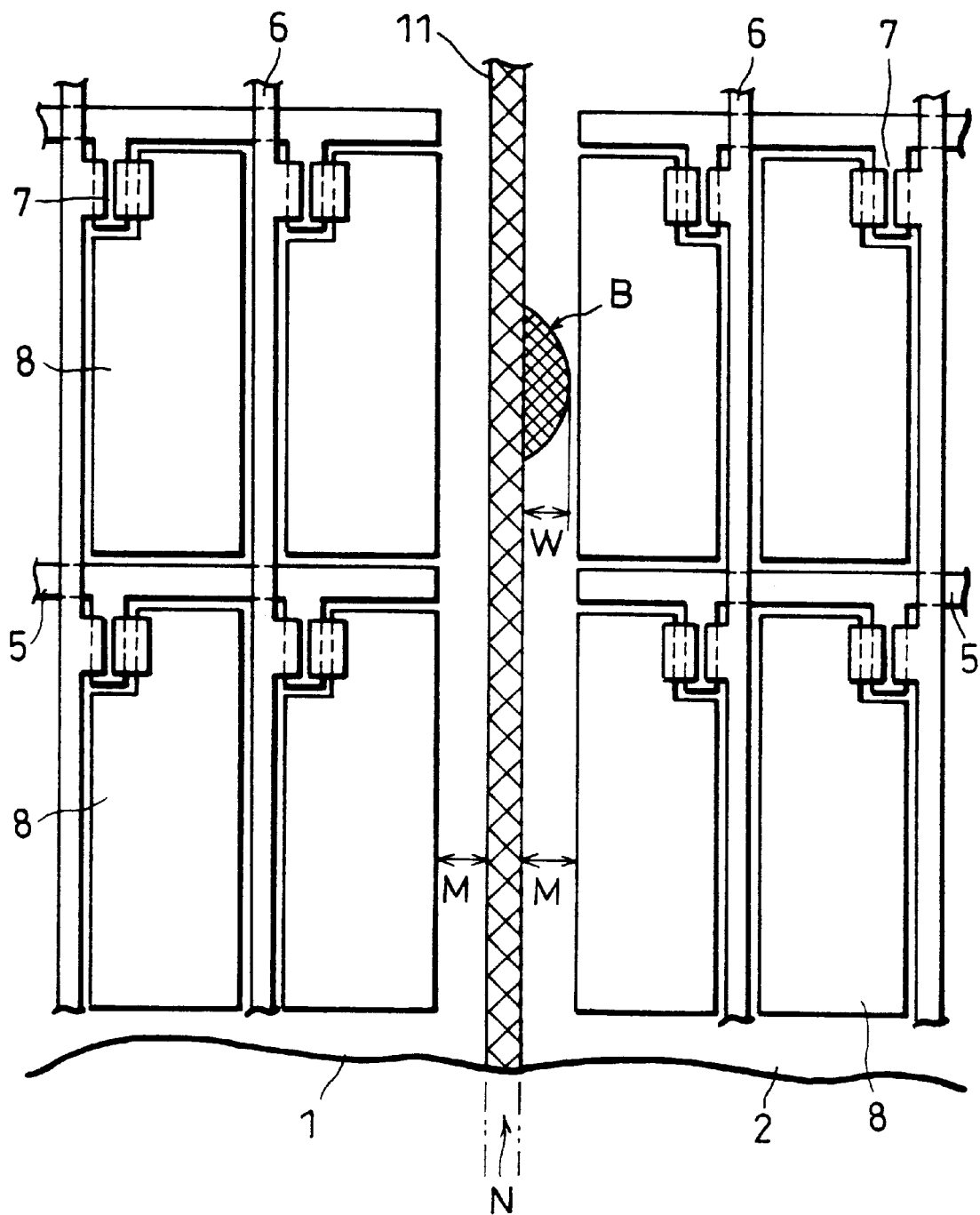
FIG. 3 is a schematic enlarged plan view of FIG. 2 wherein a connecting side of one of the TFT substrates has a chipping.

The described left and right TFT substrates 1 and 2 are connected side to side in the connecting area N using a transparent bonding material 11 shown by cross hatching in the figure for convenience. In the present embodiment, as shown in FIG. 3, a distance M between one of the connecting sides of the TFT substrates 1 and 2 and the pixel electrode 8 is selected to be 50 μm. In the case where, the width of the connecting area N is 50 μm, a distance between the pixel electrodes 8 sandwiching the connecting area N between the TFT substrate 1 and the TFT substrate 1 is calculated to be (2M+N)=150 μm.

Figure 4:
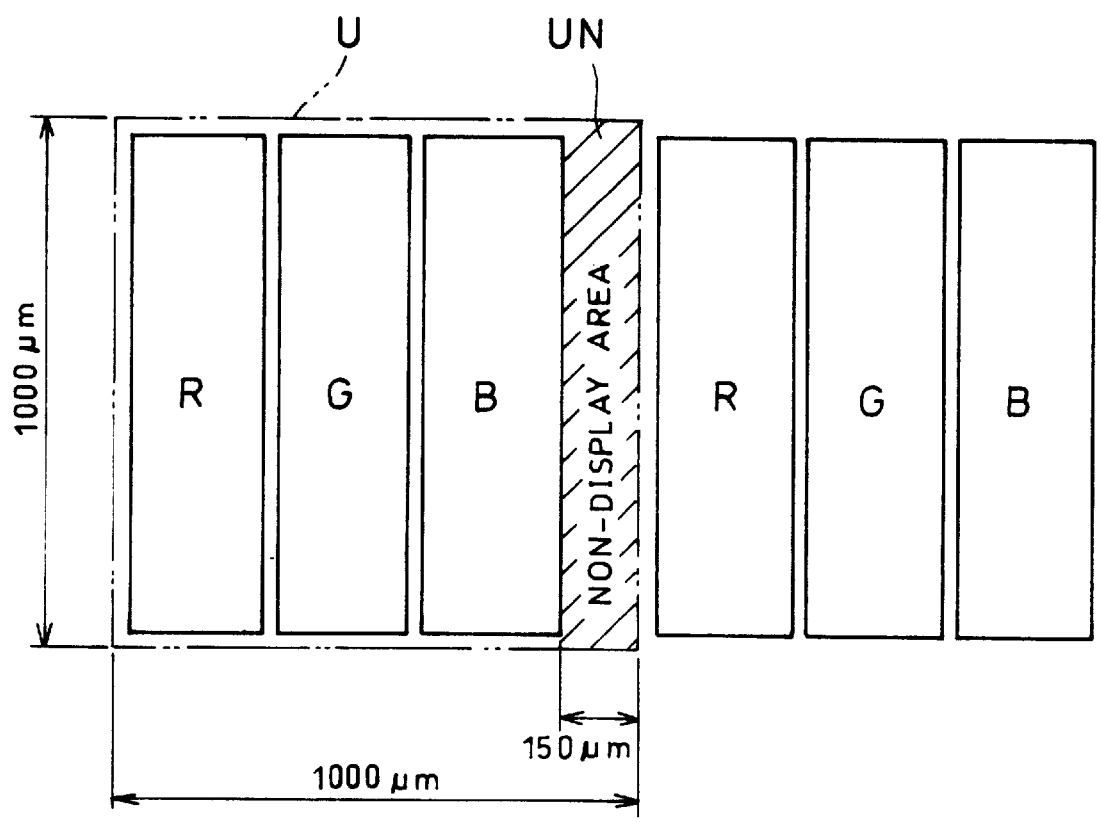
FIG. 4 is a view schematically showing a structure of one pixel unit of the liquid crystal display device shown in FIG. 1(a)

In the liquid crystal display device of the present embodiment shown in FIG. 1(a) and FIG. 1(c), for example, in order to realize a display of a diagonal of 40 inch size, and a resolution of 800×600 Super Video Graphics Array (SVGA), the size of one pixel unit of R, G and B pixels is around 1,000 μm×1,000 μm. Here, as shown in FIG. 4, by providing the non-display area NU at 150/1,000 per pixel unit U, the connecting area N of the TFT substrate can be formed within the non-display area NU. By providing the described non-display area NU for all the pixel units of the display area, the same pixel pitch as other portions can be achieved in the connecting area N of the TFT substrates 1 and 2, thereby achieving a smooth display in which a joint does not stand out. Here, it is preferable that the described non-display area NU is covered with the black matrix (BM) formed on the CF substrate 3.

When adopting a simple scribe cutting method for cutting the TFT substrate from the mother glass into a predetermined size, as protrusions and recessions of around 0.5 mm are formed on the cut surface, a flat and smooth cut surface cannot be obtained as the side face. Therefore, in the present embodiment, a dicing device with a diamond blade is adopted. By adopting the dicing device under the conditions shown in Table 1 (described earlier), a size of the protrusions and recessions formed on the cut surface can be reduced to around 0.02 mm, and the TFT substrates 1 and 2 can be connected via the connecting area N having a width of 50 μm. However, for example, even when adopting the dicing device, fine defects (chippings) B occurred at the edge of the cut surface as shown in FIG. 3. For example, when cutting by dicing under the conditions shown in Table 1, many small chippings (chipping width W of not more than 0.01 mm) and a few large chippings (chipping width W of around 0.03 to 0.05 mm) are formed irregularly in the cut length of 650 mm.

Figure 14:
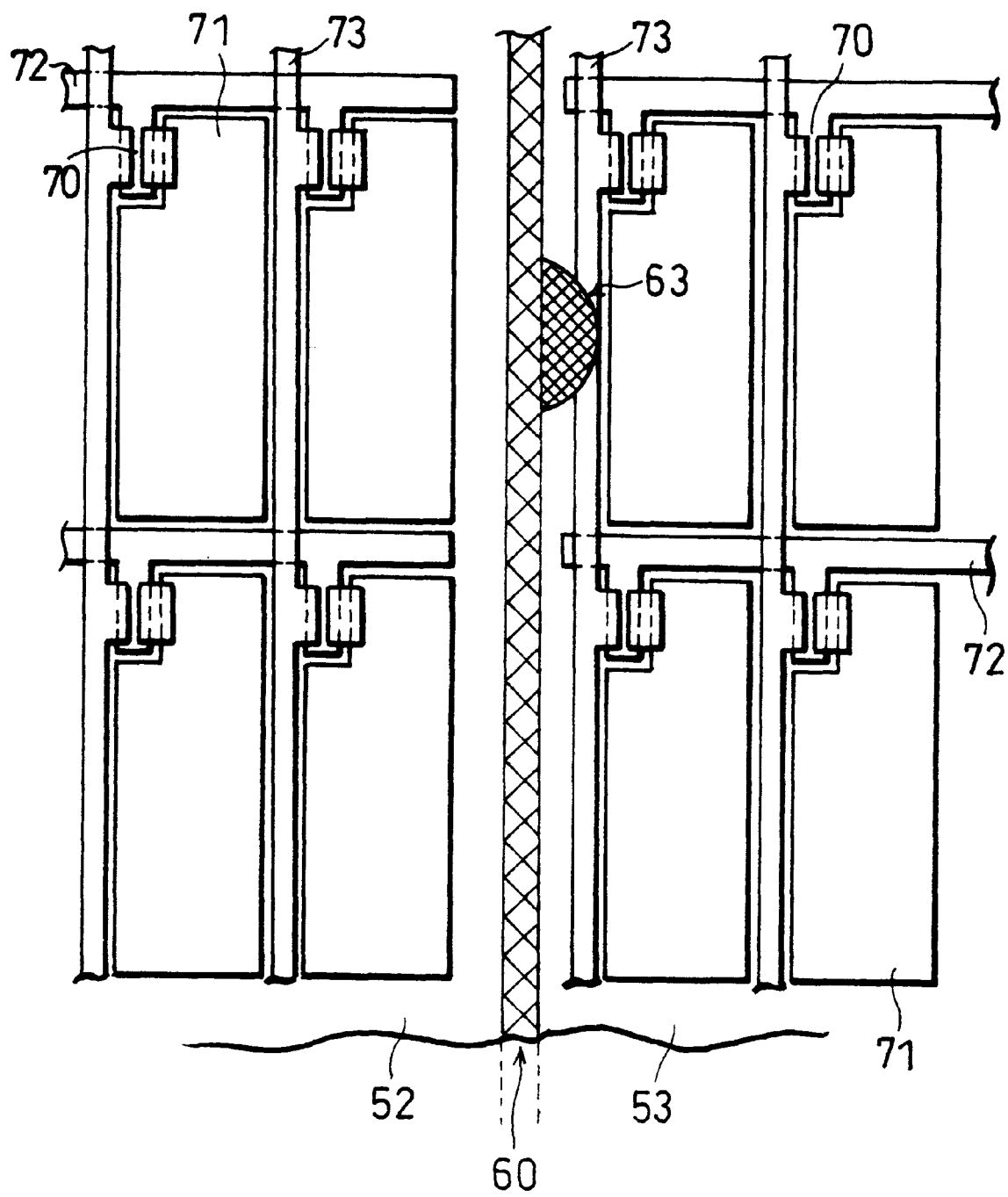
FIG. 14 is an enlarged plan view of TFT substrates when connecting TFT substrates having a chipping on one connecting side.
Figure 15A:
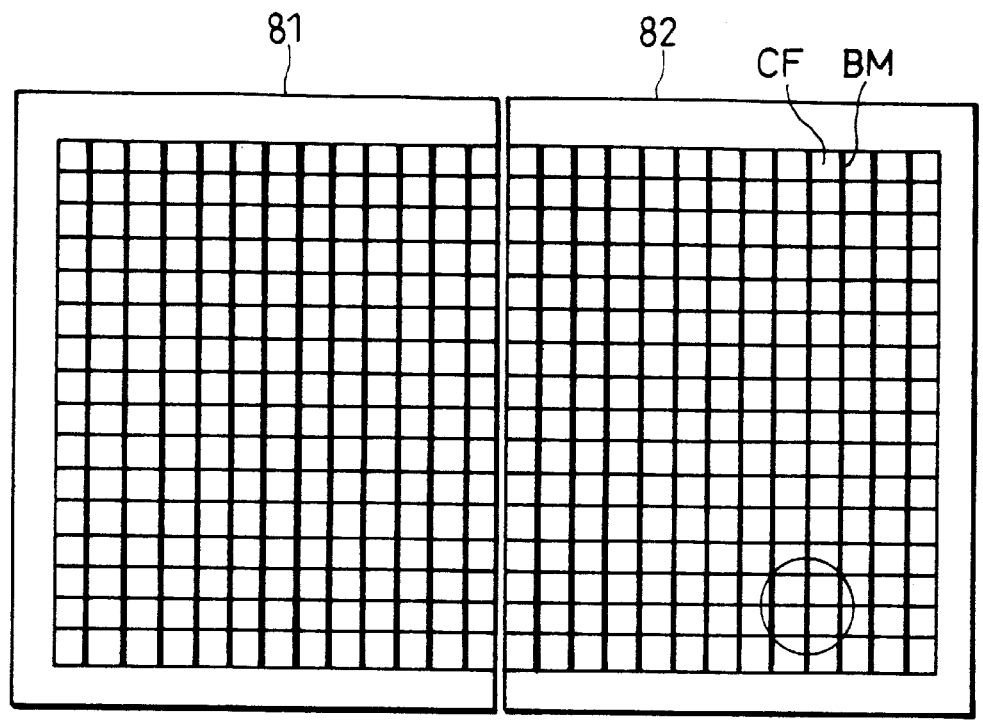
FIG. 15(a) is a plan view schematically showing a structure of a conventional liquid crystal display device.
Figure 15B:
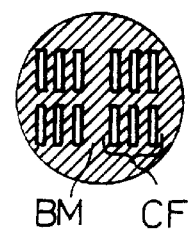
FIG. 15(b) is a partial enlarged view of FIG. 15(a)
Figure 15C:
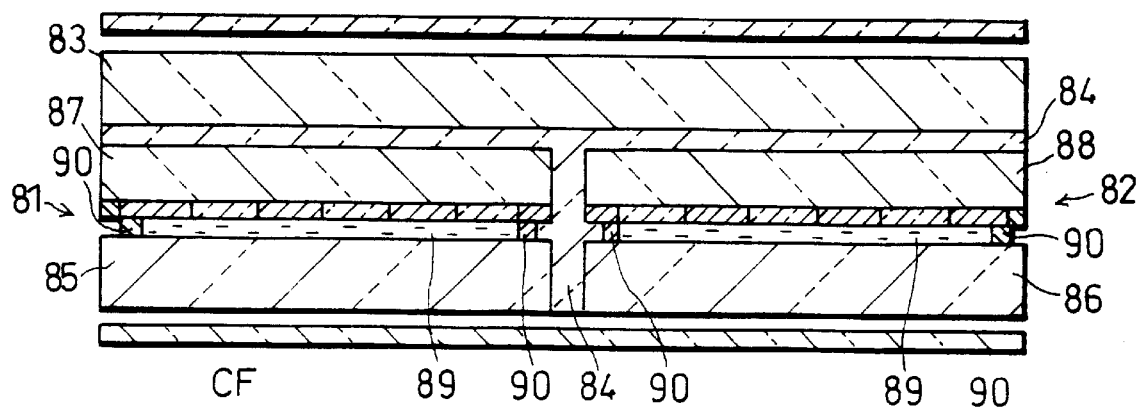
FIG. 15(c) is a cross-sectional view schematically showing the liquid crystal display device of FIG. 15(a)

In this case, in the conventional liquid crystal display device, the chippings generated when cutting by dicing the TFT substrates may cause a disconnection of the signal line connected to the connecting side, or cause a damage on an active element as shown in FIG. 14.

However, according to the liquid crystal display device of the present embodiment, as shown in FIG. 2, since not the signal lines 6 but the pixel electrodes 8 are formed adjacent to the vicinity of the connecting area N of the left and right TFT substrates 1 and 2, the described problems do not occur. This feature will be described in reference to FIG. 3.

FIG. 3 is an enlarged plan view of the TFT substrates wherein the TFT substrates 1 and 2 having the chipping B on one side are connected. As shown in the figure, even if the chipping B occurs when cutting the TFT substrates 1 and 2 by dicing, as the signal lines 6 are not formed adjacent to the connecting area N like the conventional arrangement, a disconnection of the signal line 6 due to the chipping B can be avoided. Moreover, a damage on the active element 7 can be prevented.

Additionally, by setting the clearance M from the connecting side of the TFT substrate to the pixel electrode 8 to be not less than the maximum chipping width W in consideration of a largest possible width (50 μm in this example) of a chipping, additional effects of preventing a damage (dot defect) of the pixel electrode 8 can be achieved.

As described, according to the liquid crystal display device in accordance with the present embodiment, adopting the line structure shown in FIG. 3, by setting the clearance M from the connecting area N of the TFT substrates 1 and 2 to the pixel electrode 8 to be not less than the maximum chipping width W (not less than 50 μm in this example), when cutting the TFT substrates, even if a large chipping B having a width from around 0.03 to 0.05 mm occurs, an occurrence of a disconnection inferior, or a dot defect can be prevented.

Additionally, it is not necessary to carry out the processes of cutting the substrates by dicing under optimal conditions, thereby preventing an improvement in the manufacturing efficiency. Even if a large chipping which reaches the pixel electrode 8 occurs, such chipping may cause a damage on a portion of the pixel electrode 8 (dot defect) but does not cause a line defect due to a disconnection of the signal line like the conventional arrangement, thereby suppressing the display inferior to the minimum.

The present invention has been described through the liquid crystal display device which can realize a display of a diagonal 40 inch size, and a resolution of 800×600 Super Video Graphics Array (SVGA). However, the present invention is not limited to the described size or resolution, and the present invention is applicable to a variety of liquid crystal display devices which realize a large screen display by connecting TFT substrates as shown in FIG. 1(*a*) and FIG. 1(*c*).

Figure 5A:
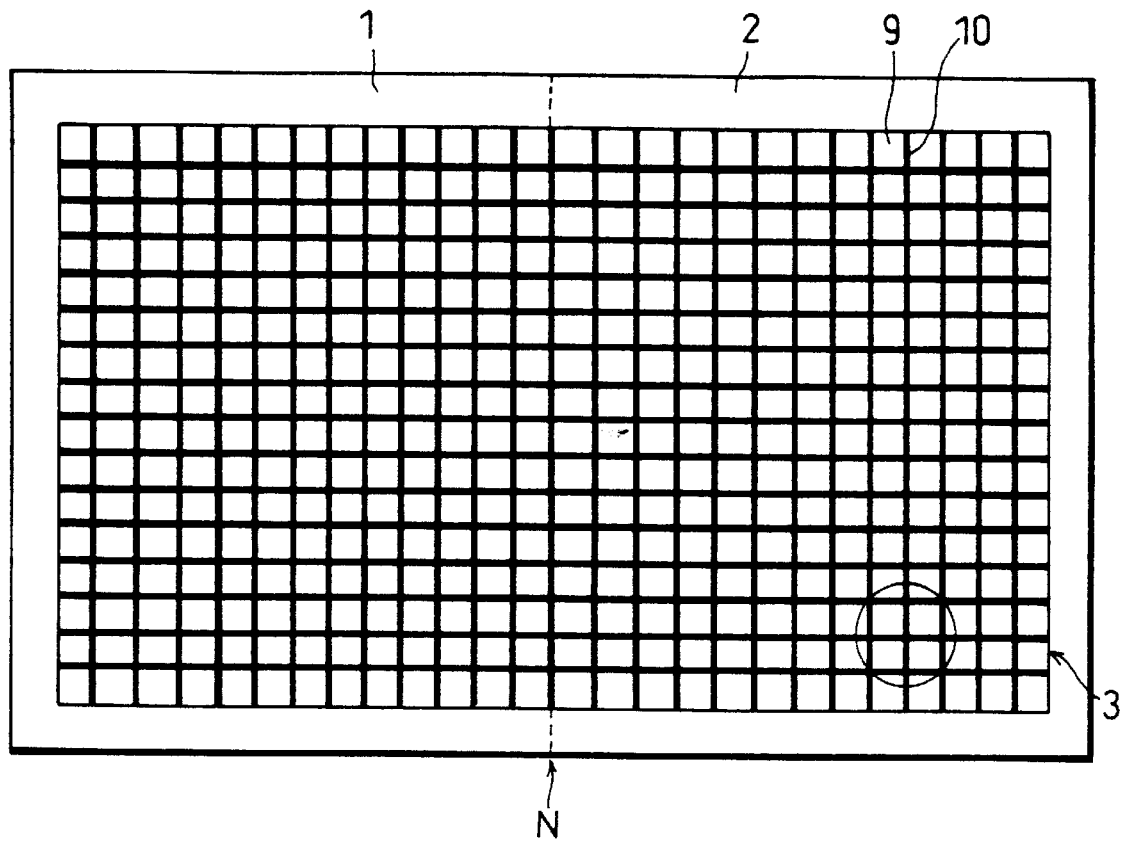
FIG. 5(a) is a plan view schematically showing a liquid crystal display device having a structure wherein a seal is formed between TFT substrates and CF substrates in the liquid crystal display device of FIG. 1(a)
Figure 5B:
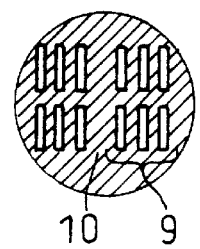
FIG. 5(b) is a partial enlarged view of FIG. 5(a)
Figure 5C:
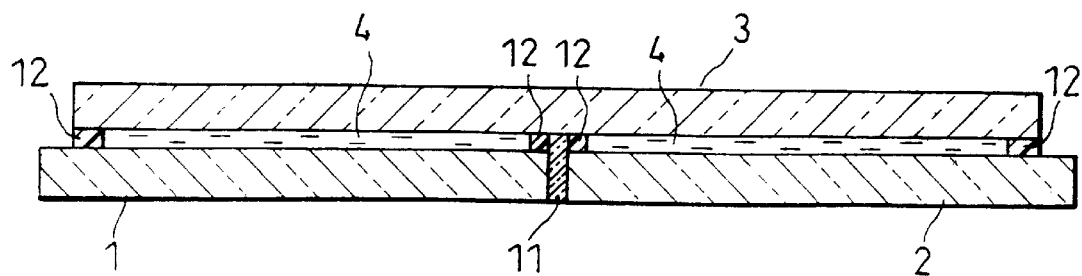
FIG. 5(c) is a cross-sectional view schematically showing the liquid crystal display device of FIG. 5(a)

Additionally, the same effects as achieved from the arrangement of the present embodiment can be achieved also from the liquid crystal display device shown in the plan view of FIG. 5(*a*) and the cross-sectional view of FIG. 5(*c*), wherein a seal 12 (seal member) is formed in the clearance between each of the TFT substrates 1 and 2 and the CF substrate 3 along the connecting area N of the TFT substrates 1 and 2. Even in the case of adopting other active element than the TFT element such as a Metal Insulator Metal (MIM), the same effects can be achieved.

As described, in the liquid crystal display device in accordance with the present embodiment, the large substrate is formed by connecting the sides of the two active matrix substrates. Further, the large substrate to the counter substrate with an electrode of substantially the same size as that of the large substrate are connected so as to sandwich the liquid crystal layer, thereby forming a large screen liquid crystal display device. The liquid crystal display device in accordance with the present embodiment has a common feature with the conventional liquid crystal display device in that a plurality of small TFT substrates are connected side to side to form a large TFT substrate. However, the arrangement of the present invention differs from the conventional arrangement in the positional relationship of (i) the scanning and signal lines formed in a matrix; and (ii) active elements and the pixel electrodes between the TFT substrates. Specifically, on the TFT substrate on the right side of the connecting area, the active element connected to the signal line and the pixel electrode are formed on the left side of the signal line extending in a direction parallel to the connecting side (Y-direction in FIG. 2). In contrast, on the TFT substrate on the left side of the connecting area, the active element and the pixel electrode are formed on the right side of the signal line. Namely, not the signal lines but the pixel electrodes are formed adjacent to a vicinity of the side face of the left and right TFT substrates.

Therefore, when cutting the TFT substrates by dicing, etc., even if large chippings (having a chipping width of from 0.03 to 0.05 mm) occur for the described reason, a damage on the signal line or active element can be prevented. Additionally, even if a large chipping which reaches the pixel electrode occurs, such chipping may damage a portion of the pixel electrode (dot defect) but does not cause a line defect due to a disconnection of the signal line like the conventional arrangement, thereby suppressing the display inferior to the minimum. According to the described arrangement, by setting the clearance from the connecting side of the active matrix substrate to the pixel electrode to be not less than the maximum chipping width in consideration of largest possible width of a chipping, additional effects of preventing a damage of the pixel electrode (dot defect) can be achieved.

[Embodiment 2]

The following descriptions will explain another embodiment of the present invention in reference to Figures.

A liquid crystal display device in accordance with the present embodiment adopts a large substrate prepared by connecting TFT substrates 21 through 24 (active matrix substrates, TFT substrates) side to side to be positioned adjacently in a longitudinal direction and a lateral direction in such a manner that adjoining sides are connected with one corner of each TFT substrate placed at the center. Further, by connecting the large substrate to a counter substrate having a color filter so as to sandwich the liquid crystal layer, a large screen liquid crystal display device is realized. Here, the counter substrate has an electrode of substantially the same size as the large substrate. Therefore, the liquid crystal display device of the present embodiment has the same structure as the liquid crystal display device shown in the first embodiment except for the number of small substrates to be connected.

Figure 6:
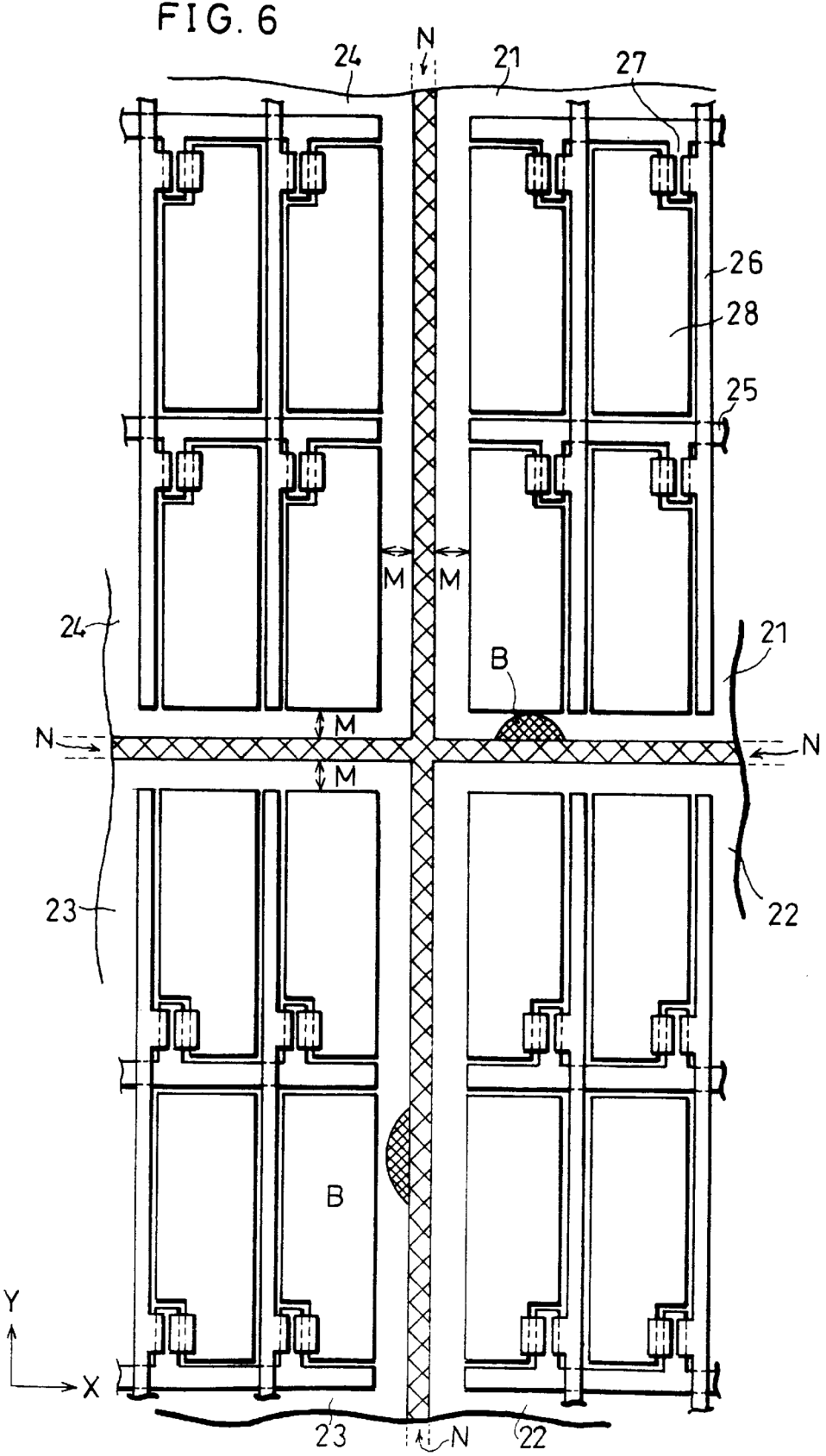
FIG. 6 is an enlarged plan view schematically showing a vicinity of connecting parts of TFT substrates connected side to side to be positioned adjacently in a longitudinal direction and a lateral direction of a liquid crystal display device in accordance with another embodiment of the present invention.

FIG. 6 is an enlarged plan view showing a vicinity of a connecting area N of TFT substrates 21 through 24 connected side to side to be positioned adjacently in a longitudinal direction and a lateral direction. FIG. 6 shows a positional relationship of (i) the scanning and signal lines 25 and 26 formed in a matrix; and (ii) active elements 27 and the pixel electrodes 28. As is clear from the figure, the arrangements of the TFT substrates 21 through 24 connected side to side to be positioned adjacently in a lateral direction and a longitudinal direction differ in the positional relationship of (i) the scanning and signal lines 25 and 26 provided in a matrix; and (ii) active elements 27 and the pixel electrodes 28. Namely, the TFT substrates 21 through 24 are arranged so as to be symmetrical in the positional relationship of i) the scanning lines 24 and the signal lines 26 and ii) the active element 27 and the pixel electrode 28 in both the longitudinal direction and the lateral direction with respect to the respective connecting areas N.

Specifically, on the upper right TFT substrate 21, the active element 27 to be connected to the signal line 26, and the scanning line 25 and the pixel electrode 28 are formed on the left side of the signal line 26 extending in the first direction (Y-direction), for example, substantially parallel to the connecting side of the TFT substrates 21 and 24 and below the scanning line 25 extending in the second direction (X direction) which crosses the first direction substantially at right angle. On the lower right TFT substrate 22, the active element 27 and the pixel electrode 28 are formed on the left side of the signal line 26 and above the scanning line 25. On the upper left TFT substrate 24, the active element 27 and the pixel electrode 28 are formed on the right side of the signal line 26 and above the scanning line 25. On the lower left TFT substrate 23, the active element 27 and the pixel electrode 28 are formed on the right side of the signal line 26 and above the scanning line. Namely, not the scanning line 25 and the signal line 26 but the pixel electrode 28 is formed adjacent to a vicinity of each connecting area N of the TFT substrates 21 through 24. In other words, on each of the TFT substrates 21 through 24, each pixel electrode 28 is formed closer to the connecting area N than the scanning line 25 extending in the X-direction along the connecting area N, and is closer to the connecting area N than the signal line 26 formed in the Y-direction along the connecting area N.

Therefore, when cutting the TFT substrates 21 through 24 by dicing, etc., even if large chippings (having a chipping width of from 0.03 to 0.05 mm) occur for the described reason, a damage on the signal line 26, the scanning line 25, and the active element can be prevented by the similar function to that of the first embodiment.

Additionally, by setting the clearance M from the connecting side of the TFT substrate to the pixel electrode 28 to be not less than the maximum chipping width W in consideration of a largest possible width (50 μm in this example) of a chipping which may possibly occurs, for both the connecting side in the X-direction and the connecting side in the Y-direction, additional effects of preventing a damage (dot defect) of the pixel electrode 28 can be achieved.

According to the arrangement of the present embodiment, by setting the clearance from the connecting side of the active matrix substrate to the pixel electrode to be not less than the maximum chipping width W for both connecting sides in the X and Y directions in consideration of a largest possible width of a chipping, additional effects of preventing a damage (dot defect) of the pixel electrode 28 can be achieved.

Additionally, it is not necessary to carry out the processes of cutting the substrates by dicing under optimal conditions, thereby preventing an improvement in the manufacturing efficiency. Additionally, even if a large chipping which reaches the pixel electrode 28 occurs, such chipping may damage a portion of the pixel electrode 28 (dot defect) but does not cause a line defect due to a disconnection of the signal line like the conventional arrangement, thereby suppressing the display inferior to the minimum.

As described, the liquid crystal display device of the present embodiment has a similar arrangement to that of the first embodiment except for the number of active matrix substrates to be connected. Namely, in the present embodiment, a large substrate is formed by connecting the active matrix substrates side to side to be positioned adjacently in a longitudinal direction and a lateral direction. Further, by connecting this large substrate to the counter substrate of substantially the same size via the liquid crystal layer, a large screen liquid crystal device is realized.

In the present embodiment, as shown in FIG. 6, on the upper right TFT substrate, the active element to be connected to the signal line and the scanning line, and the pixel electrode are formed on the left side of the signal line extending in the Y-direction and below the scanning line extending in the X direction. On the lower right TFT substrate, the active element and the pixel electrode are formed on the left side of the signal line and above the scanning line. On the left above TFT substrate, the active element and the pixel electrode are formed on the right side of the signal line and below the scanning line. On the lower left TFT substrate, the active element and the pixel electrode are formed on the right side of the signal line and above the scanning line.

Therefore, when cutting the connecting side of these TFT substrates, for example, by dicing, even if a large chipping is formed on the connecting side for the described reason (chipping depth W of around 0.03 to 0.05 mm), a damage on the signal line, the scanning line and the active element can be prevented as in the arrangement of the first embodiment. Additionally, even if a large chipping which reaches the pixel electrode occurs, such chipping may cause a damage on a pixel (dot defect) but does not cause a line defect such as a disconnection of a line, etc., thereby suppressing a display defect to the minimum.

[Embodiment 3]

The following descriptions will explain one embodiment of the present invention in reference to figures.

Figure 7A:
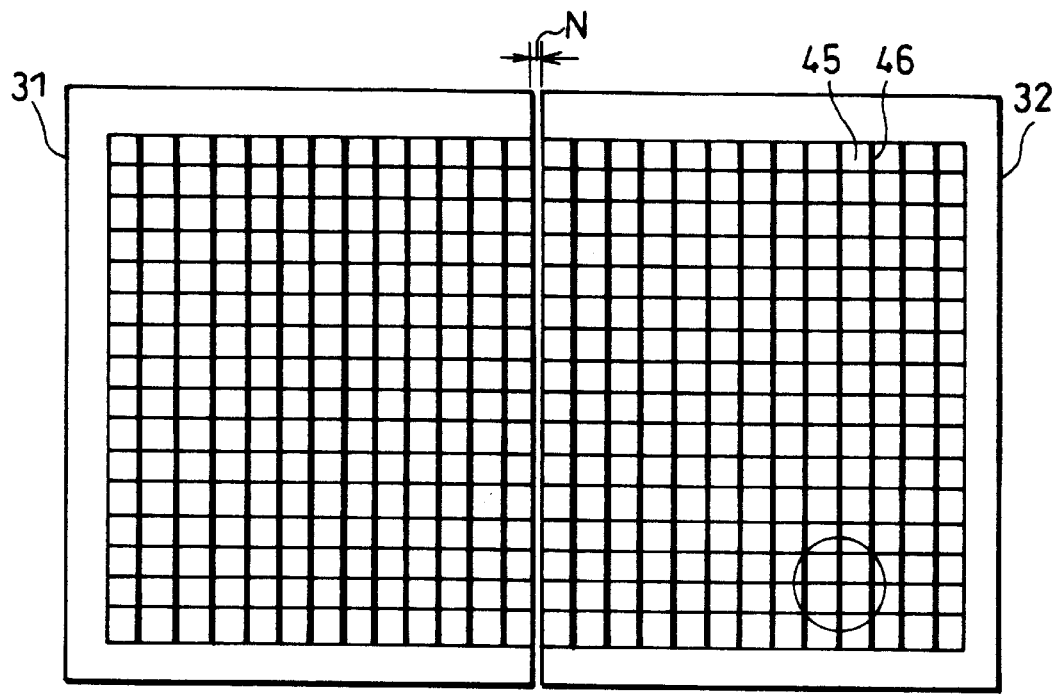
FIG. 7(a) is a cross-sectional view schematically showing a liquid crystal display device in accordance with still another embodiment of the present invention.
Figure 7B:
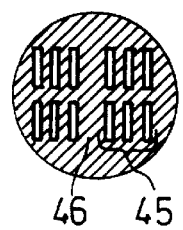
FIG. 7(b) is a partial enlarged view of FIG. 7(a)
Figure 7C:
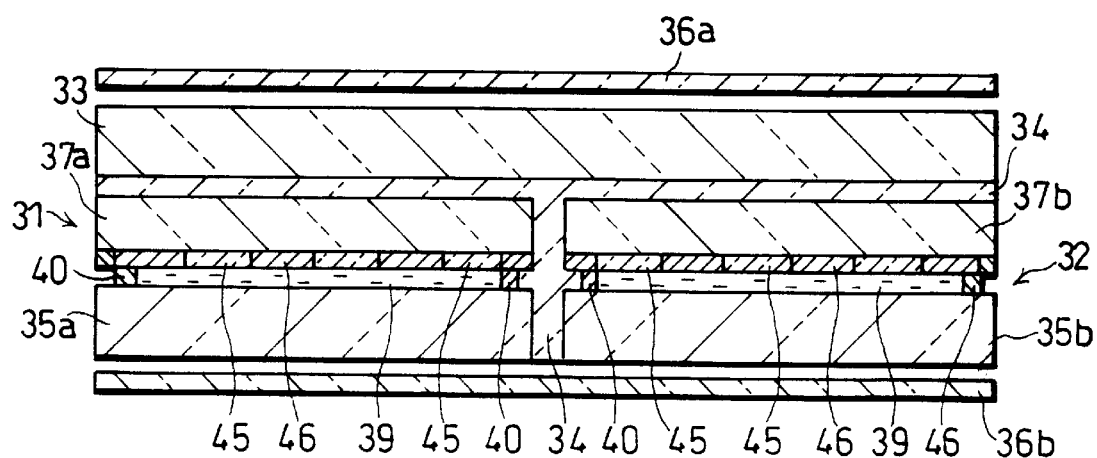
FIG. 7(c) is a cross-sectional view schematically showing the liquid crystal display device of FIG. 7(a)

FIG. 7(a) is a plan view showing a schematic structure of the liquid crystal display device in accordance with the present embodiment, and FIG. 7(c) is a cross-sectional view of the same. As shown in FIG. 7(a) and FIG. 7(c), the liquid crystal display device of the present embodiment has a large substrate wherein left and right active matrix liquid crystal panels 31 and 32 (liquid crystal panels) are connected side to side to be bonded to a reinforcing substrate 33 using a bonding agent 34.

As shown in FIG. 7(a) through FIG. 7(c) and FIG. 8, the TFT substrates 35a and 35b for use in the liquid crystal display panels 31 and 32 are arranged such that scanning lines 41 (gate bus lines) and signal lines 42 (source bus lines) which are formed in a matrix, active elements 43 adopting thin film transistors (TFTs) made of a semiconductor material such as amorphous silicone, polysilicone, etc., for the switching element provided at junctions of the matrix of the scanning and signal lines 41 and 42, and pixel electrodes 44 made of a transparent electrically conductive film such as Indium Tin Oxide (ITO), etc., are formed on a transparent substrate made of, for example, glass, using the known materials and processes.

On the other hand, each of the counter electrodes (CF substrate) 37a and 37b is arranged such that respective color filers 45 (see FIG. 7(a)) for red (R), green (G) and blue (B) colors provided for each pixel, a light-shielding film (black matrix (BM)) 46 formed in a matrix for preventing a leakage of light through a space between the pixel substrates 44, and a common electrode made of a transparent electrically conductive film made of ITO, etc., are formed on a transparent substrate made of, for example, glass, using known materials and processes. The TFT substrate is arranged such that the gate electrode is connected to the scanning line 41, the source electrode is connected to the signal line 42, and the drain electrode is connected to the pixel electrode 44.

The TFT substrates 35a and 35b and the counter substrates 37a and 37b are connected respectively by a seal 40 (seal member) shown by hatching in the figure for convenience. The seal 40 is formed in a flame in a peripheral portion of each of a liquid crystal display panels 31 and 32, and a liquid crystal layer 39 is sealed within the flame. Additionally, the polarization plates 36a and 36b are formed both on the light incident side and the light emitting side of the liquid crystal display device, and in the normally white mode, the respective polarization axes of the polarization plates 36a and 36b are formed so as to cross at right angle.

FIG. 8 is an enlarged plan view showing a vicinity of the connecting part of the left and right TFT substrates 35a and 35b which constitute the liquid crystal display device shown in FIG. 7(a) and FIG. 7(c). FIG. 8 shows a positional relationship of (i) the scanning and signal lines 41 and 42 formed in a matrix; and (ii) active elements 43 and the pixel electrodes 44. As shown in FIG. 8, the respective arrangements of the left TFT substrate 35a and the right TFT substrate 35b which are connected side to side differ in their positional relationships of (i) the scanning and signal lines 41 and 42 formed in a matrix; and (ii) active elements 43 and the pixel electrodes 44. Namely, in the above positional relationship, the TFT substrate 35a and the TFT substrate 35b are symmetrical with respect to the connecting area N'.

Specifically, on the TFT substrate 35b on the right side of the connecting area N', the active elements 43 having the signal lines 42 connected to their source electrodes respectively, and pixel electrodes 44 are formed on the left side of the signal lines 42 extending in a direction substantially parallel to the connecting side (Y-direction in the figure). On the other hand, on the TFT substrate 35a on the left side of the connecting area N', the active element 43 and the pixel electrode 44 are formed on the right side of the signal lines 42 extending in the Y-direction. Namely, not the signal lines 42 but the pixel electrodes 44 are formed adjacent to a vicinity of the connecting area N of the left and right TFT substrates 35a and 35b.

In the present embodiment, as shown in FIG. 8, a distance M' between one of the connecting sides of the TFT substrates 35a and 35b and the pixel electrode 44 is selected to be 150 $\mu$m. In the case where the width of the connecting area N' is 150 $\mu$m, a distance between the pixel electrodes 44 sandwiching the connecting area N' between the TFT substrate 35a and the TFT substrate 35b is calculated to be (2M'+N')=350 $\mu$m.

In the liquid crystal display device of the present embodiment shown in FIG. 7(a) and FIG. 7(c), for example, in order to realize a display of a diagonal of 40 inch size, a resolution of 800×600 Super Video Graphics Array (SVGA), the size of one pixel unit of pixels for red, green and blue colors is around 1,000 $\mu$m×1,000 $\mu$m. Here, as shown in FIG. 9, by providing the non-display area NU at 350/1,000 per pixel unit U, the connecting area N' of the TFT substrate can be formed within the non-display area NU. By providing the described non-display area for all the pixel units of the display area, the connecting area N of the TFT substrates 35a and 35b can be formed at the same pitch as other portions, thereby achieving a smooth display in which a joint does not stand out. Here, it is preferable that the described non-display area NU is covered with the black matrix (BM) formed on the CF substrate 37a and 37b.

Additionally, the left and right liquid crystal display panels 31 and 32 are connected together in the connecting area N' using the bonding agent 34. Further, a seal 40 is formed along the connecting sides of the TFT substrates for connecting the TFT substrates 35a and 35b to the CF substrates 37a and 37b respectively. The seal 40 is provided along the connecting sides of the left and right TFT substrates within a seal pattern in a flame formed at the peripheral portions of the respective liquid crystal display panels 31 and 32. In order to achieve a uniform pitch by setting a pixel pitch in the connecting area equivalent to the pixel pitch in other areas, it is preferable to form the seal 40 as thin as possible at the closest possible position to the pixel electrode 44 formed along the connecting side. For example, in the structure shown in FIG. 8, it is required to form the seal 40 within the clearance M' (150 $\mu$m) between the connecting side of the TFT substrate and the pixel electrode 44. For the material of the seal 40, it is preferable to adopt a photo-setting seal material which is less likely to alter its shape when hardening to avoid adverse effects on the display pixel adjoining the seal 40, such as a display inferior, etc. Specifically, an acrylic ultraviolet-ray-setting seal material may be used.

Figure 16:
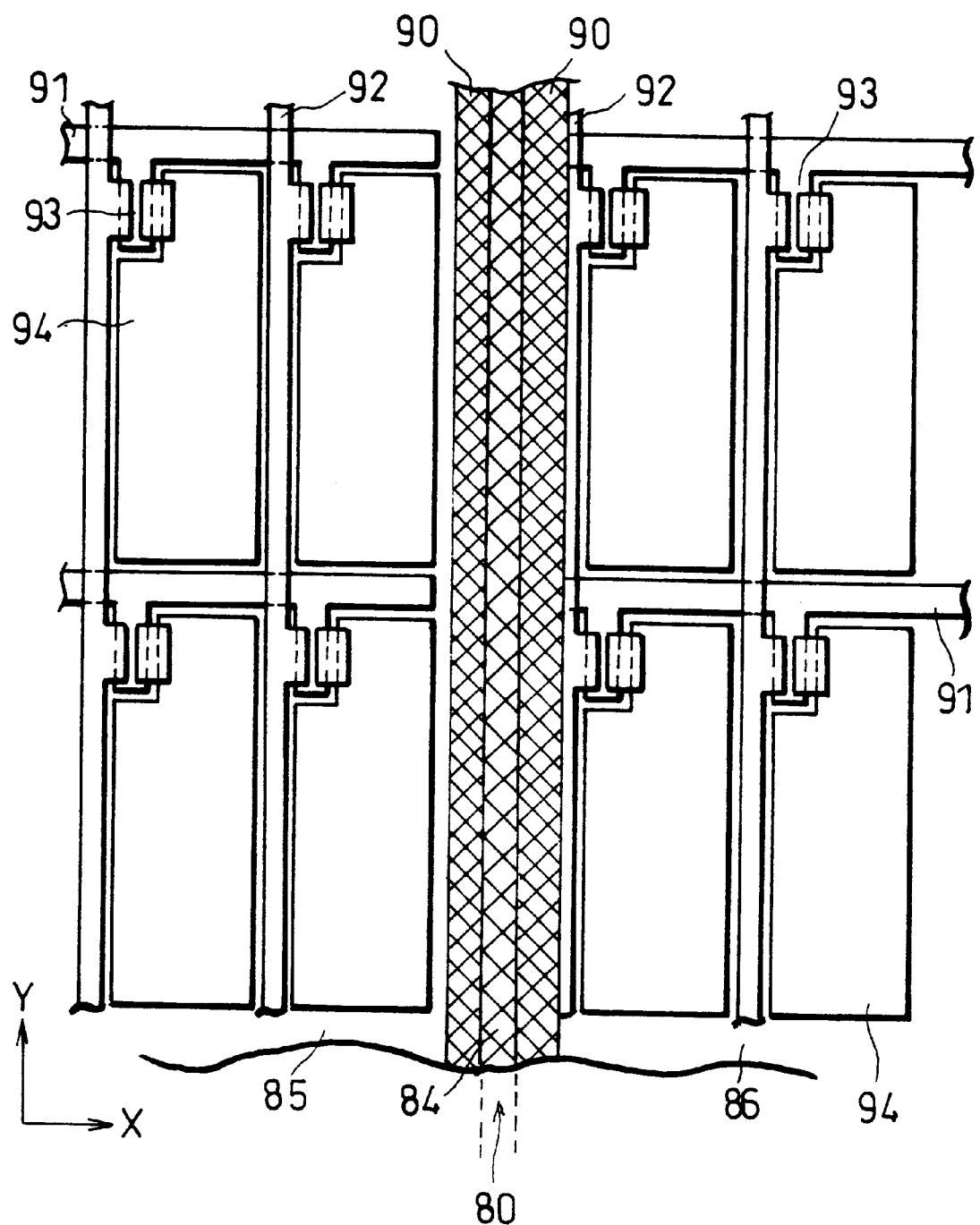
FIG. 16 is an enlarged plan view schematically showing a vicinity of a connecting area of left and right TFT substrates of the liquid crystal display device of FIG. 15(a).

In the conventional arrangements, (i) the scanning lines 91 and the signal lines 92 formed in a matrix and (ii) the active elements 93 and the pixel electrodes 94 have the positional relationship shown in FIG. 16. Therefore, the seal 90 may overlap the signal line 92 formed along the connecting side, and when hardening the seal 90 by a projection of a light beam, the light is blocked by the signal line 92, thereby causing a hardening inferior of the seal 90.

In contrast, in the liquid crystal display device of the present invention, as shown in FIG. 8, even if the seal 40 is formed as close as possible to the pixel electrode 44 adjacent to the connecting area N', the signal line 42 does not overlap the seal 40. Therefore, even when projecting light from the side of the TFT substrates, the light is not blocked by the signal line 42, and the seal 40 can be hardened completely. As a result, the display pixel adjacent to the seal 40 can be prevented from having adverse effects of a hardening inferior of the seal 40, such as display inferior, etc.

Although the present invention has been described through the liquid crystal display device which can realize a display of a diagonal of 40 inch size, and a resolution of 800×600 Super Video Graphics Array (SVGA), the present invention is not limited to the described size or resolution. The present invention is applicable to a variety of liquid crystal display devices which realize a large screen display by connecting right and left active matrix liquid crystal display panels side to side on the plane using a bonding agent as shown in FIG. 7(*a*) and FIG. 7(*c*). Even in the case of adopting other active element than the TFT element such as a Metal Insulator Metal (MIM), the same effects can be achieved.

As described, in the liquid crystal display device in accordance with the present embodiment, a large screen is realized by connecting the left and right active matrix liquid crystal panels side to side on the reinforcing substrate. Each of the liquid crystal display panel has a common feature with the conventional liquid crystal display panel in that the TFT substrate and the counter substrate (CF substrate) are connected together by a seal formed at the peripheral portions of the liquid crystal display panel so as to sandwich the liquid crystal.

However, the TFT substrate of the present embodiment differs from that of the conventional TFT substrate in the positional relationship of (i) the scanning and signal lines formed in a matrix; and (ii) active elements and the pixel electrodes in each TFT substrate. Specifically, on the TFT substrate on the right side of the connecting area, the active element connected to the signal line and the pixel electrode are formed on the left side of the signal line extending in a direction parallel to the connecting side (Y-direction in FIG. 8). On the other hand, on the TFT substrate on the left side of the connecting area, the active element and the pixel electrode are formed on the right side of the signal line. Namely, not the signal lines but the pixel electrodes are formed adjacent to a vicinity of the side face of the left and right TFT substrates.

Therefore, when providing the seal along the connecting side of the TFT substrate, even if the seal is formed close to the pixel electrode, the seal does not overlap the signal line. As a result, even if light is projected from the TFT substrate for hardening the seal, as the light is not blocked by the signal line, the seal can be hardened completely.

[Embodiment 4]

The following descriptions will explain another embodiment of the present invention in reference to figures.

A liquid crystal display device in accordance with the present embodiment realizes a large panel by connecting active matrix liquid crystal display panels side to side to be positioned adjacently in a longitudinal direction and a lateral direction on a reinforcing substrate in such a manner that adjoining sides are connected with one corner of each liquid crystal display panel placed at the center. The arrangement of the liquid crystal display device of the present embodiment is the same as the arrangement of the liquid crystal display panel of the third embodiment except for the number of the liquid crystal display panels to be connected.

Figure 10:
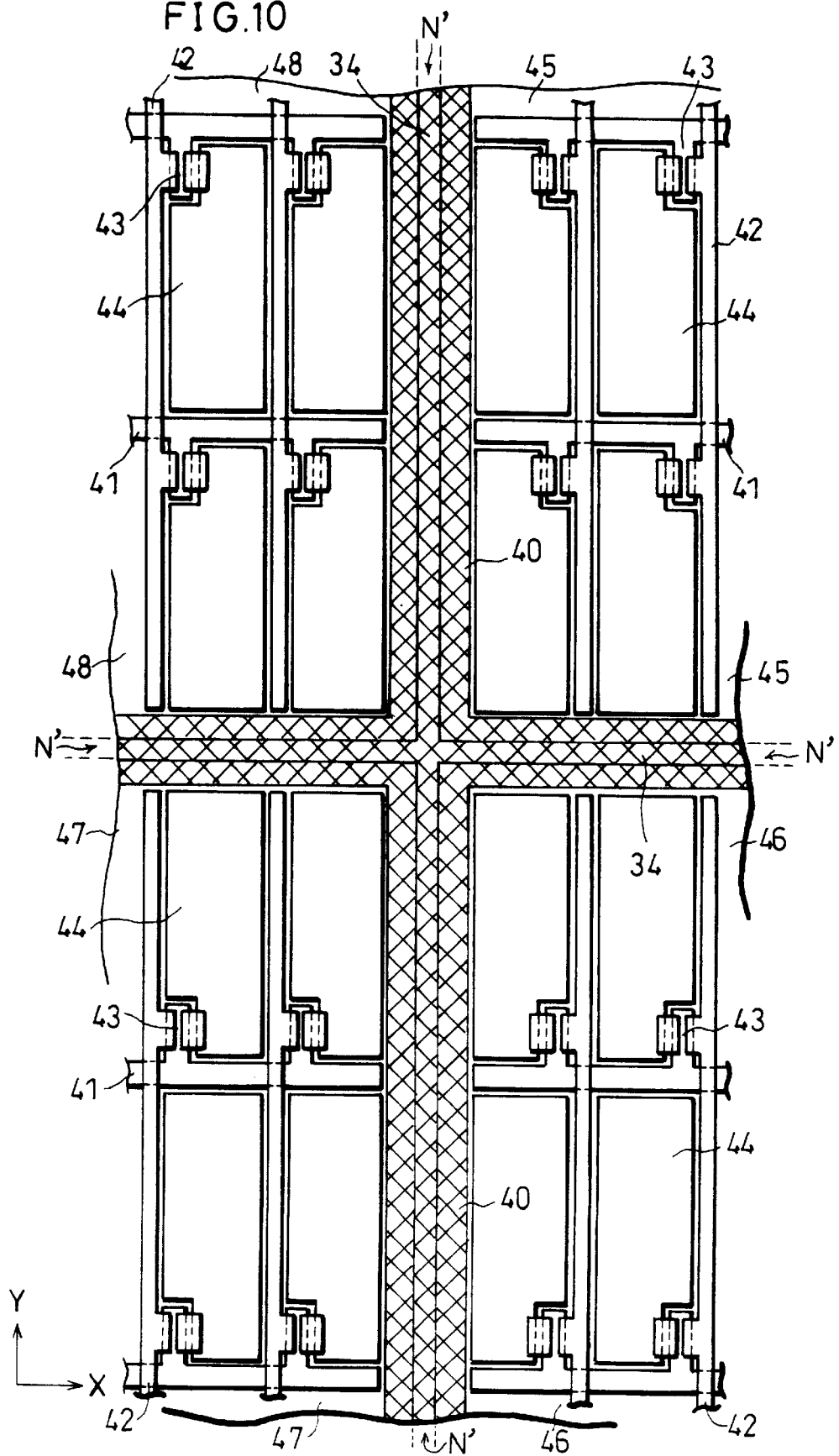
FIG. 10 is an enlarged plan view schematically showing a vicinity of a connecting area of TFT substrates connected side to side to be positioned adjacently in a longitudinal direction and a lateral direction of a liquid crystal display device in accordance with still another embodiment of the present invention.
Figure 11A:
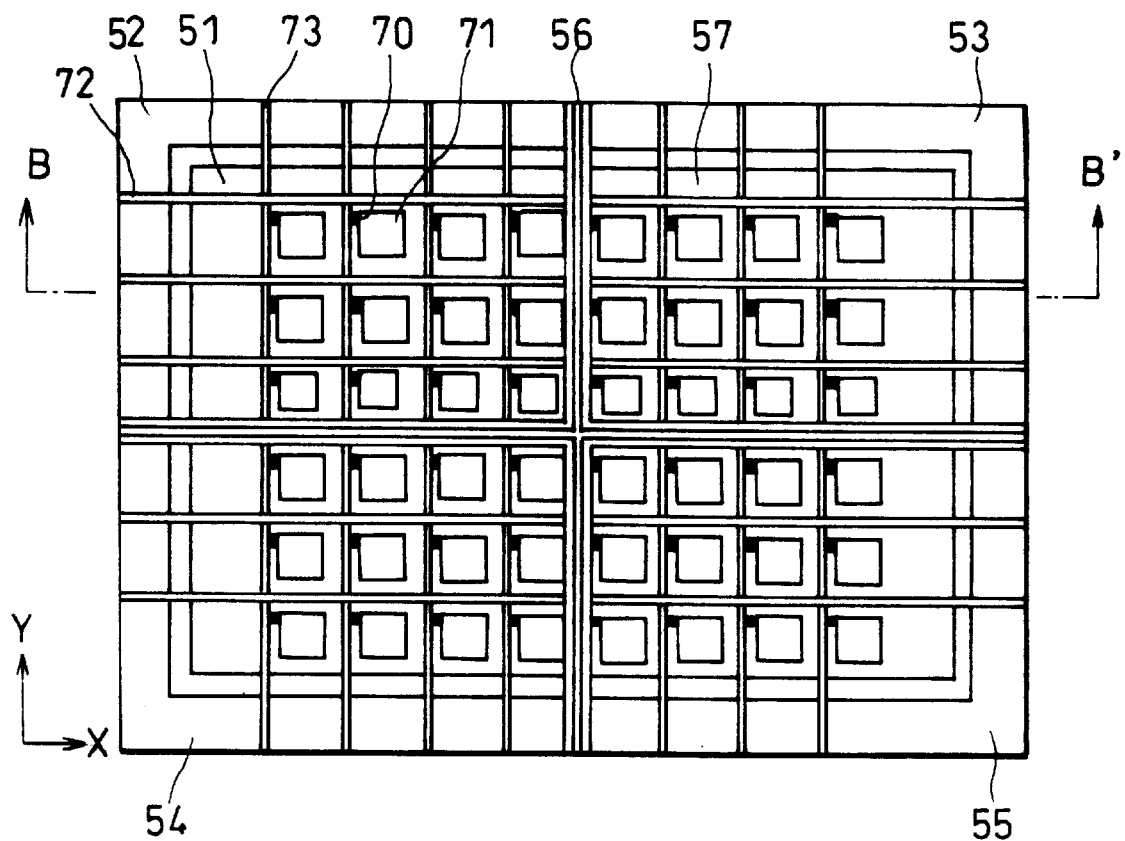
FIG. 11(a) is a plan view schematically showing a structure of a conventional liquid crystal display device.
Figure 11B:
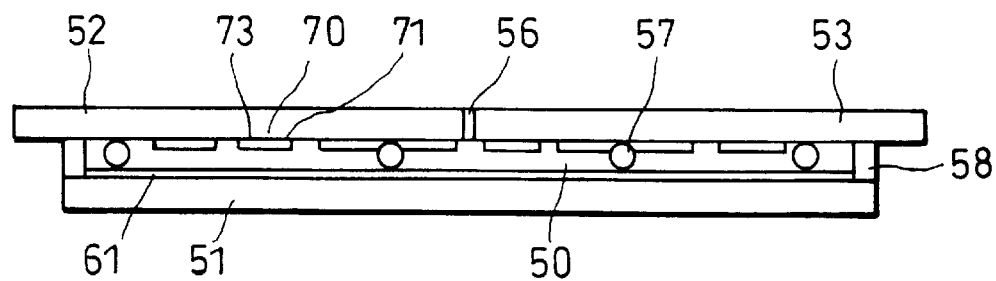
FIG. 11(b) is a cross-sectional view taken from a side of an arrow B–B' of the liquid crystal display device of FIG. 11(a)
Figure 12:
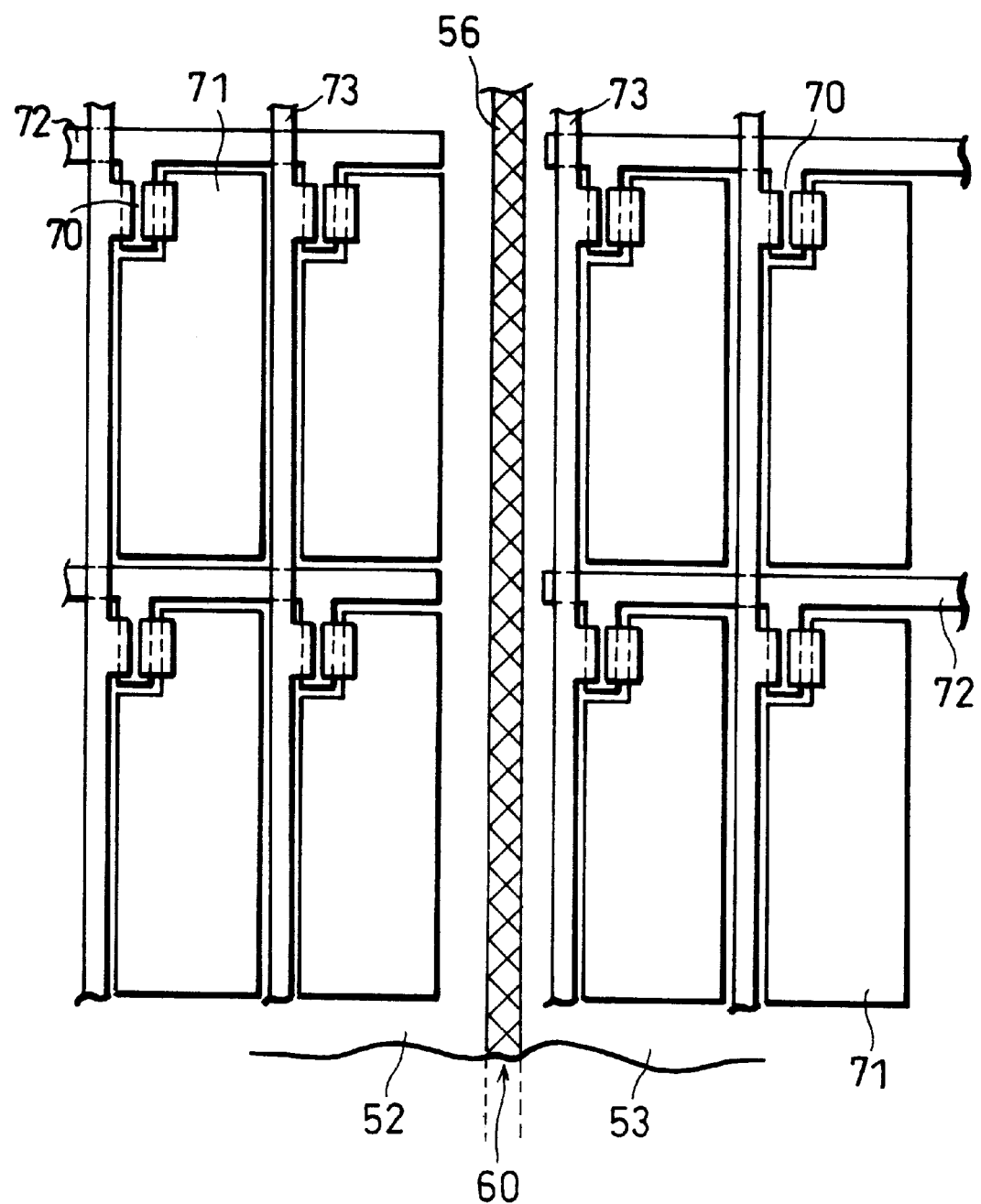
FIG. 12 is an enlarged plan view schematically showing a vicinity of left and right TFT substrates which constitute the liquid crystal display device of FIG. 11(a)
Figure 13:
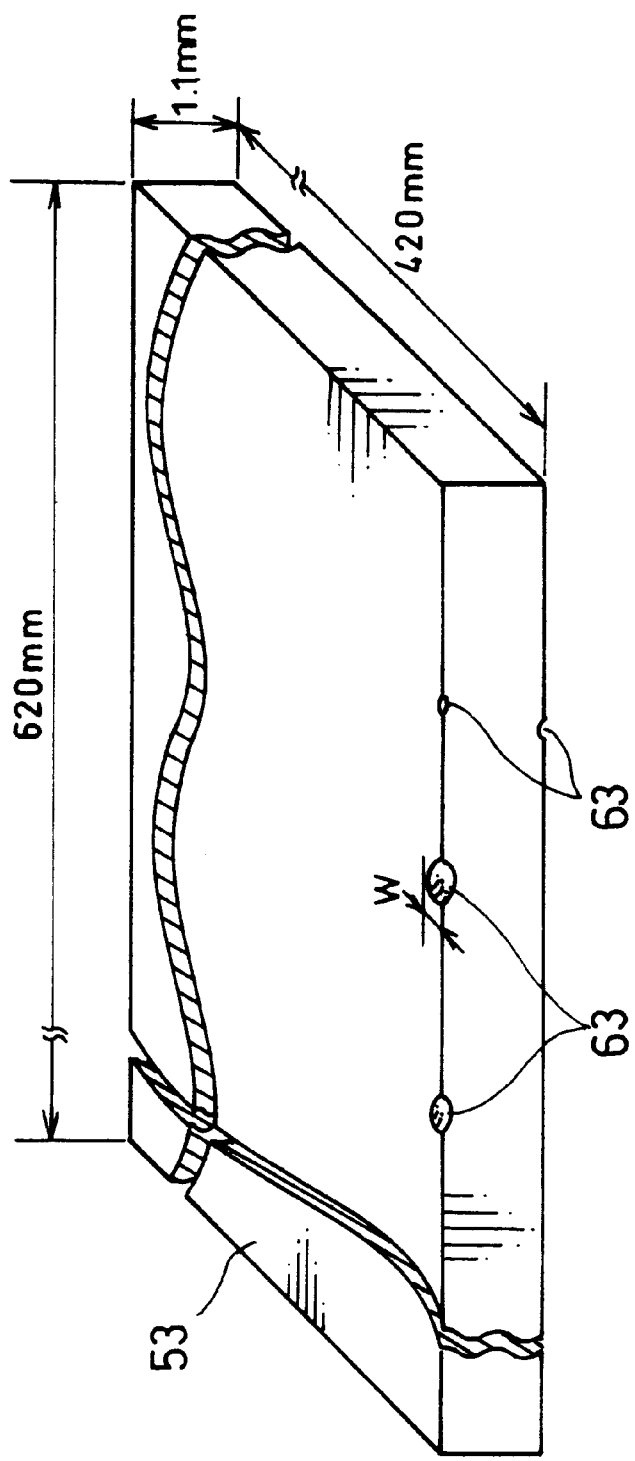
FIG. 13 is a view schematically showing a fine defect (chipping) formed on an edge of a cut surface when cutting a TFT substrate using a dicing device.

FIG. 10 is an enlarged plan view showing a vicinity of a connecting part of the TFT substrates which are positioned adjacently in a longitudinal direction and a lateral direction. FIG. 10 shows a positional relationship of (i) the scanning and signal lines 41 and 42 formed in a matrix; and (ii) the active elements 43 and the pixel electrodes 44. As is clear from the figure, the respective arrangements of the TFT substrates 45 through 48 differ in the positional relationship of (i) the scanning and signal lines 41 and 42 formed in a matrix; and (ii) the active elements 43 and the pixel electrodes 44. Namely, the TFT substrates 45 through 48 are arranged so as to be symmetrical in the positional relationship of i) the scanning lines 41 and the signal lines 42 and ii) the active element 43 and the pixel electrode 44 both in the longitudinal direction and the lateral direction with respect to the respective connecting areas N'.

Specifically, on the upper right TFT substrate 45, the active element 43 to be connected to the signal line 42 and the scanning line 41 and the pixel electrode 44 are positioned on the left side of the signal line 42 extending in the first direction (Y-direction), and below the scanning line 41 extending in the second direction (X-direction) which crosses the first direction substantially at right angle. On the lower right TFT substrate 46, the active element 43 and the pixel electrode 44 are positioned on the left side of the signal line 42 and above the scanning line 41. On the upper left TFT substrate 48, the active element 43 and the pixel electrode 44 are positioned on the right side of the signal line 42 and below the scanning line 41. On the lower left TFT substrate 47, the active element 43 and the pixel electrode 44 are positioned on the right side of the signal line 42 and above the scanning line 41. Namely, not the scanning lines 41 and the signal lines 42 but the pixel electrodes 44 are formed adjacent to a vicinity of respective connecting areas N' of the TFT substrates 45 through 48.

Therefore, when providing the seal 40 along the connecting sides of the TFT substrates 45 through 48, even if the seal 40 is provided close to the pixel electrode 44, the seal 40 does not overlap the signal line 42 or the scanning line 41. Therefore, even when projecting light from the side of the TFT substrate for hardening the seal 40, as the light is not blocked by the signal line 42 or the scanning line 41, the seal 40 can be hardened completely.

As described, according to the arrangement of the present embodiment, a large screen liquid crystal display device is realized by connecting four liquid crystal display panels side to side on the reinforcing substrate by a bonding agent to be positioned adjacently in a longitudinal direction and a lateral direction. In the present embodiment, as shown in FIG. 10, on the upper right TFT substrate, the active element to be connected to the signal line and the scanning line and the pixel electrode are positioned on the left side of the signal line extending in the Y-direction and below the scanning line extending in the X-direction. On the lower right TFT substrate, the active element and the pixel electrode are positioned on the left side of the signal line and above the scanning line. On the upper left TFT substrate, the active element and the pixel electrode are positioned on the right side of the signal line and below the scanning line. On the lower left TFT substrate, the active element and the pixel electrode are positioned on the right side of the signal line and above the scanning line.

According to the described arrangement, when forming the seal along the connecting sides of these TFT substrates, even if the seal is formed close to the pixel electrode, the seal does not overlap the signal line or the scanning line. Therefore, even when projecting light from the side of the TFT substrate for hardening the seal, as the light beam is blocked by the signal line or the scanning line, the seal can be hardened completely.

The first liquid crystal display device in accordance with the present invention is characterized by including a large substrate composed of a plurality of active matrix substrates connected side to side and a counter substrate with an electrode in substantially the same size as the large substrate which are connected together so as to sandwich a liquid crystal layer, each active matrix substrate having signal lines and scanning lines formed in a matrix and active elements and pixel electrodes formed in a vicinity of junctions between the signal lines and the scanning lines, wherein on each active matrix substrate, the pixel electrodes are formed closer to a connecting side than a signal line or a scanning line formed along and adjacent to the connecting side of the active matrix substrates.

According to the described arrangement, not the signal line but the pixel electrode are formed adjacent to the connecting side of the active matrix substrates which constitute the liquid crystal display device. Therefore, when cutting the connecting sides of the active matrix substrates by dicing, even if chippings are formed along the connecting side, the signal line or the active element can be prevented from being damaged. Additionally, even if a large chipping which reaches the pixel electrode occurs, only the pixel affected by the chipping is damaged (dot defect), and a line defect such as a disconnection of the signal line, etc., can be prevented, thereby suppressing a display inferior to the minimum.

In the arrangement of the first liquid crystal display device, it is preferable that the distance between the pixel electrodes adjacent to the connecting side is not less than 50 μm.

According to the described arrangement, by setting the clearance from the connecting side of the active matrix substrate to the pixel electrode to be not less than the maximum chipping width in consideration of a largest possible width of a chipping, additional effects of preventing a damage of the pixel electrode (dot defect) can be achieved.

The second liquid crystal display device in accordance with the present invention which realizes a large screen is characterized by including a plurality of liquid crystal display panels connected side to side on the plane, each liquid crystal display panel having signal lines and scanning lines which are formed in a matrix, and active elements and pixel electrodes formed in a vicinity of junctions between the signal lines and the scanning lines, wherein the pixel electrodes are formed close to the connecting side than the signal line or the scanning line formed along and adjacent to the connecting side of the liquid crystal display panel.

According to the described arrangement, as a line are formed further from the connecting area than the pixel electrodes, even if the seal material is formed at the closet possible position to the pixel electrode adjacent to the connecting side, light to be projected from the side of the active matrix substrates can reach the seal material without being blocked by the line, thereby permitting the seal material to be hardened completely. As a result, the liquid crystal display device of the described arrangement permits a display inferior due to the hardening inferior of the seal material to be prevented, and thus an improved display quality of a large screen liquid crystal display device can be achieved.

A method of manufacturing a large screen liquid crystal display device which includes a plurality of liquid crystal display panels connected side to side on a plane, each liquid crystal display panel having signal lines and scanning lines which are formed in a matrix, and active elements and pixel electrodes formed in a vicinity of junctions between the signal lines and the scanning lines is characterized by including the steps of (a) preparing active matrix substrates in such a manner that the pixel electrodes are positioned closer to the connecting area than a line formed along the connecting area of the liquid crystal display panels; (b) preparing a seal material at peripheral portions between the active matrix substrate and the counter substrate; and (c) hardening the seal material by projecting light from a side of the active matrix substrates.

According to the described method of manufacturing a liquid crystal display device of the present invention, as lines are formed further from the connecting area than the pixel electrodes, even if the seal material is formed at the closest possible position to the pixel electrodes adjacent to the connecting side, light to be projected from the side of the active matrix substrate can reach the seal material without being blocked by lines, thereby permitting the seal material to be hardened completely. As a result, the method of manufacturing a liquid crystal display device which can prevent a display inferior due to the hardening inferior of the seal material can be achieved, and thus the method offers the liquid crystal display device of an improved display quality.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A liquid crystal display device, comprising:
   a large substrate obtained by connecting a plurality of small substrates side to side;
   a counter substrate provided so as to oppose said large substrate; and
   a liquid crystal layer sealed between said large substrate and said counter substrate,
   wherein all of said plurality of small substrates are structured such that lines formed in a matrix, and pixel electrodes provided at junctions of the lines formed in the matrix are provided in such a manner that the pixel electrodes are formed closer to a connecting area of the small substrates than the lines formed along the connecting area of the small substrates.

2. A liquid crystal display device, comprising:
   a large substrate composed of a plurality of active matrix substrates connected side to side;
   a counter substrate having an electrode provided so as to oppose said large substrate; and
   a liquid crystal layer sealed between said large substrate and said counter substrate,
   wherein each active matrix substrate includes lines formed in a matrix and active elements and pixel electrodes provided at respective junctions of the lines formed in the matrix, and
   all of said plurality of active matrix substrates are structured such that said pixel electrodes are positioned closer to a connecting area between said active matrix substrates than lines formed along the connecting area of said active matrix substrates.

3. The liquid crystal display device as se forth in claim 2, wherein:
   said large substrate is composed of two active matrix substrates which are positioned in parallel, and
   said two active matrix substrates are arranged so as to be symmetrical with respect to the connecting area in a positional relationship of i) said lines and ii) said active elements and said pixel electrodes.

4. The liquid crystal display device as set forth in claim 2, wherein:
   said large substrate is composed of four active matrix substrates positioned adjacently in a longitudinal direction and a lateral direction, and
   said four active matrix substrates are arranged so as to be symmetrical in a positional relationship of (i) said lines and ii) said active elements and said pixel electrodes with respect to respective connecting areas.

5. The liquid crystal display device as set forth in claim 2, wherein:
   a distance between the connecting area of the active matrix substrates and a pixel electrode adjacent to the connecting area is not less than a width of a largest possible chipping of the active matrix substrate.

6. The liquid crystal display device as set forth in claim 5, wherein:
   the distance between the connecting area and the pixel electrode is not less than 50 $\mu$m.

7. The liquid crystal display device as set forth in claim 2, wherein:
   a width of a non-display area of one pixel unit of three pixels for red, green and blue colors is set substantially equivalent to a distance between pixel electrodes which are adjacent to each other via the connecting area.

8. The liquid crystal display device as set forth in claim 7, wherein:
   said non-display area is covered with a black matrix formed on said counter substrate.

9. The liquid crystal display device as set forth in claim 2, wherein:
   said active element is a thin film transistor.

10. A liquid crystal display device comprising:
    a plurality of liquid crystal display panels connected side to side on a plane,
    wherein each liquid crystal display panel includes:
      a display substrate and a counter substrate provided so as to oppose said display substrate, and a liquid crystal layer sealed between said display substrate and said counter substrate,
      said display substrate includes lines formed in a matrix, and pixel electrodes provided at respective junctions of the lines formed in the matrix, and
      all of said liquid crystal display panels are structured such that said pixel electrodes are provided closer to the connecting area than lines formed along the connecting area of said liquid crystal display panels.

11. A liquid crystal display device comprising:
    a plurality of liquid crystal display panels connected side to side on a plane,
    wherein each liquid crystal display panel includes:
      an active matrix substrate and a counter substrate provided so as to oppose said active matrix substrate, a seal member formed between the active matrix substrate and the counter substrate and a liquid crystal layer sealed between said active matrix substrate and said counter substrate sealed by said seal member,
      said active matrix substrate includes lines formed in a matrix, and active elements and pixel electrodes provided at respective junctions of the lines formed in the matrix, and
      all of said plurality of liquid crystal display panels are structured such that said pixel electrodes are provided closer to the connecting area than lines formed along the connecting area of said liquid crystal display panels.

12. The liquid crystal display device as set forth in claim 11, wherein:
    said plurality of display panels are two liquid crystal display panels which are adjacently positioned in parallel, and
    said two liquid crystal display panels are arranged so as to be symmetrical in a positional relationship of (i) the lines and (ii) the active elements and the pixel electrodes with respect to said connecting area between the liquid crystal display panels.

13. The liquid crystal display device as set forth in claim 11, wherein:
    said plurality of liquid crystal display panels are four liquid crystal display panels positioned adjacently in a longitudinal direction and a lateral direction,
    wherein said four liquid crystal panels are arranged so as to be symmetrical in a positional relationship of (i) the lines and ii) active elements and the pixel electrodes with respect to respective connecting areas.

14. The liquid crystal display device as set forth in claim 11, wherein:
    said seal member is provided within a space formed between the connecting area of said active matrix substrates of said liquid crystal panels and said pixel electrodes adjacent to the connecting area.

15. The liquid crystal display device as set forth in claim 11, wherein:
    said seal member is made of a photo-setting seal material.

16. The liquid crystal display device as set forth in claim 15, wherein:
    said photo-setting seal material is an ultraviolet-ray-setting seal material.

17. The liquid crystal display device as set forth in claim 11, wherein:
    a width of a non-display area adjacent to one pixel unit of three pixels for red, green and blue colors is set substantially equivalent to a distance between pixel electrodes which are adjacent to each other via the connecting area.

18. The liquid crystal display device as set forth in claim 17, wherein:
    said non-display area is covered with a black matrix formed on said counter substrate.

19. The liquid crystal display device as set forth in claim 11, wherein:
    said active element is a thin film transistor.

20. The liquid crystal display device as set forth in claim 10, wherein:
    said plurality of liquid crystal display panels are formed on a reinforcing substrate.

21. The liquid crystal display device of claim 1, 2, 10 or 11 wherein the lines are signal lines and scanning lines.

22. A method of manufacturing a liquid crystal display device which realizes a large screen by connecting a plurality of active matrix substrates side to side, each active matrix substrate including lines formed in a matrix and active elements and pixel electrodes formed at respective junctions of the lines, comprising the steps of:
    (a) preparing active matrix substrates in such a manner that the pixel electrodes are formed closer to the connecting area than lines formed along a connecting area between the active matrix substrates; and
    (b) preparing a large substrate by connecting the active matrix substrates prepared in said step (a) side to side.

23. A method of manufacturing a liquid crystal display panel which realizes a large screen by connecting a plurality of display panels side to side on a plane, each liquid crystal display panel being composed of an active matrix substrate and a counter substrate with an electrode and a liquid crystal layer sealed between said active matrix substrate and said counter substrate by a seal member, said active matrix substrate including lines formed in a matrix and active elements and pixel electrodes formed at respective junctions of the lines, comprising the steps of:

(a) preparing active matrix substrates in such a manner that said pixel electrodes are positioned closer to the connecting area than lines formed along said connecting area of said liquid crystal display panels;

(b) preparing a seal material at peripheral portions of said active matrix substrate and said counter substrate; and (c) hardening said seal material by projecting light from a side of the active matrix substrates.

24. The method of manufacturing the liquid crystal display device as set forth in claim 23, wherein:

said seal material is placed between a space formed between the connecting area of the active matrix substrates and the pixel electrodes.

25. The method of manufacturing the liquid crystal display device as set forth in claim 23, wherein:

said step (a) includes the step of cutting by dicing said active matrix substrates.

26. The method of manufacturing the liquid crystal display device as set forth in claim 22 or 23 wherein the lines are signal lines and scanning lines.

27. A large substrate obtained by connecting a plurality of small substrates side to side, wherein all of said plurality of small substrates are structured such that, lines are formed in a matrix, and pixel electrodes provided at junctions of the lines formed in the matrix are provided in such a manner that the pixel electrodes are formed closer to a connecting area of the small substrates than lines formed along the connecting area of the small substrates.

28. A large substrate composed of a plurality of active matrix substrates connected side to side, wherein each active matrix substrate includes lines formed in a matrix and active elements and pixel electrode provided at respective junctions of the lines formed in the matrix, and all of said plurality of active matrix substrates are structured such that said pixel electrodes are positioned closer to a connecting area between said active matrix substrates than lines formed along the connecting area of said active matrix substrates.

29. The large substrate as set forth in claim 28, wherein:

said plurality of active matrix substrates are composed of two active matrix substrates which are positioned in parallel, and said two active matrix substrates are arranged so as to be symmetrical with respect to the connecting area in a positional relationship of i) said lines and ii) said active elements and said pixel electrodes.

30. The large substrate as set forth in claim 28 wherein:

said plurality of active matrix substrates are composed of four active matrix substrates positioned adjacently in a longitudinal direction and a lateral direction, and said four active matrix substrates are arranged so as to be symmetrical in a positional relationship of i) said lines and ii) said active elements and said pixel electrodes with respect to respective connecting areas.

31. The large substrate as set forth in claim 28, wherein:

a distance between the connecting area of the active matrix substrates and a pixel electrode adjacent to the connecting area is not less than a width of a largest possible chipping of the active matrix substrate.

32. The large substrate as set forth in claim 31, wherein:

the distance between the connecting area and the pixel electrode is not less than 50 $\mu$m.

33. The large substrate as set forth in claim 28, wherein:

said active element is a thin film transistor.

34. The large substrate as set forth in claim 28, wherein:

said plurality of active matrix substrates are formed on a reinforcing substrate.

35. The large substrate of claim 27 or 28 wherein the lines are signal lines and scanning lines.

* * * * *